United States Patent
Ishida et al.

(10) Patent No.: US 9,548,502 B2
(45) Date of Patent: Jan. 17, 2017

(54) FUEL CELL STACK

(71) Applicant: Honda Motor Co., Ltd., Tokyo (JP)

(72) Inventors: Kentaro Ishida, Utsunomiya (JP); Seiji Sugiura, Utsunomiya (JP); Yoshihito Kimura, Utsunomiya (JP); Yukihito Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/022,417

(22) PCT Filed: Sep. 17, 2014

(86) PCT No.: PCT/JP2014/074465
§ 371 (c)(1),
(2) Date: Mar. 16, 2016

(87) PCT Pub. No.: WO2015/041222
PCT Pub. Date: Mar. 26, 2015

(65) Prior Publication Data
US 2016/0211533 A1    Jul. 21, 2016

(30) Foreign Application Priority Data

Sep. 17, 2013 (JP) .................................. 2013-192077
Sep. 8, 2014 (JP) .................................. 2014-182331

(51) Int. Cl.
*H01M 8/02* (2016.01)
*H01M 8/10* (2016.01)
*H01M 8/24* (2016.01)

(52) U.S. Cl.
CPC ............. *H01M 8/0263* (2013.01); *H01M 8/02* (2013.01); *H01M 8/026* (2013.01);
(Continued)

(58) Field of Classification Search
CPC .. H01M 8/0258; H01M 8/026; H01M 8/0263; H01M 8/0265; H01M 8/0267
See application file for complete search history.

(56) References Cited

U.S. PATENT DOCUMENTS

2003/0215695 A1* 11/2003 Suzuki ................ H01M 8/0228
429/434
2005/0153184 A1* 7/2005 Beutel ................. H01M 8/0228
429/435
(Continued)

FOREIGN PATENT DOCUMENTS

JP    2003-338300 A    11/2003
JP    3599280 B2       12/2004
(Continued)

OTHER PUBLICATIONS

International Search Report, PCT/JP2014/074465, dated Dec. 22, 2014, 5 pages.

*Primary Examiner* — Jeremiah Smith
(74) *Attorney, Agent, or Firm* — Nelson Mullins Riley & Scarborough LLP; Anthony A. Laurentano

(57) ABSTRACT

A fuel cell stack includes a first power generation unit and a second power generation unit. Wave-like first fuel gas flow passages of the first power generation unit and wave-like first fuel gas flow passages of the second power generation unit are set to mutually different phases. The ends of the first fuel gas flow passages form linear flow passage grooves that linearly extend in the wavelength direction from the center of the width of the wave-form amplitude.

5 Claims, 29 Drawing Sheets

(52) U.S. Cl.
CPC ........... *H01M 8/0267* (2013.01); *H01M 8/10* (2013.01); *H01M 8/24* (2013.01); *H01M 8/0258* (2013.01); *H01M 8/0265* (2013.01); *H01M 2250/20* (2013.01); *Y02E 60/50* (2013.01)

(56) References Cited

U.S. PATENT DOCUMENTS

| | | | |
|---|---|---|---|
| 2010/0047649 A1 | 2/2010 | Yamada et al. | |
| 2011/0097641 A1* | 4/2011 | Goto | H01M 8/0258 429/457 |
| 2011/0123887 A1* | 5/2011 | Suda | H01M 8/0267 429/435 |
| 2011/0274999 A1* | 11/2011 | Mohri | H01M 8/0206 429/455 |

FOREIGN PATENT DOCUMENTS

| | | |
|---|---|---|
| JP | 2005-093095 A | 4/2005 |
| JP | 2008-041337 A | 2/2008 |
| JP | 2009-301996 A | 12/2009 |
| JP | 2010-238536 A | 10/2010 |

\* cited by examiner

FUEL CELL STACK

RELATED APPLICATIONS

This application is a 35 U.S.C. 371 national stage filing of International Application PCT/JP2014/074465, filed Sep. 17, 2014, which claims priority to Japanese Patent Application No. 2013-192077 filed Sep. 17, 2013and Japanese Patent Application No. 2014-182331 filed Sep. 8, 2014 in Japan. The contents of the aforementioned applications are hereby incorporated by reference.

TECHNICAL FIELD

The present invention relates to a fuel cell stack including a first power generation unit and a second power generation unit. Each of the first power generation unit and the second power generation unit is formed by stacking a membrane electrode assembly and a separator. A coolant flow field is formed between the first power generation unit and the second power generation unit.

BACKGROUND ART

For example, a solid polymer electrolyte fuel cell employs a membrane electrode assembly (MEA) which includes a solid polymer electrolyte membrane, an anode provided on one side of the solid polymer electrolyte membrane, and a cathode provided on the other side of the solid polymer electrolyte membrane. The solid electrolyte membrane is a polymer ion exchange membrane. The membrane electrode assembly is sandwiched between separators to form a power generation cell (unit cell). Generally, several tens to hundreds of power generation cells are stacked together to form a fuel cell stack, e.g., for use in a vehicle.

In the fuel cell, as separators, metal separators of thin corrugated plates may be adopted. A wavy fuel gas flow field including a plurality of flow grooves is formed in a surface of the metal separator facing an anode, for allowing the fuel gas to flow along an electrode surface of the anode in a wavy pattern. A wavy oxygen-containing gas flow field including a plurality of flow grooves is formed in a surface of the metal separator facing a cathode, for allowing the oxygen-containing gas to flow along an electrode surface of the cathode in a wavy pattern.

As a fuel cell of this type, for example, a fuel cell stack disclosed in Japanese Laid-Open Patent Publication No. 2009-301996 is known. In this fuel cell stack, first power generation units and second power generation units are stacked together alternately, and a coolant flow field is formed in each space between the adjacent first and second power generation units. In each power generation unit, an electrolyte electrode assembly is formed by interposing an electrolyte between an anode and a cathode, and the electrolyte electrode assembly is sandwiched between metal separators. Further, in the metal separators, a wavy fuel gas flow field for supplying a fuel gas to the anode and a wavy oxygen-containing gas flow field for supplying an oxygen-containing gas to the cathode are provided.

In the first power generation unit, wavy flow grooves of the fuel gas flow field and wavy flow grooves of the oxygen-containing gas flow field are in the same phase. In the second power generation unit, wavy flow grooves of the fuel gas flow field and wavy flow grooves the oxygen-containing gas flow field are in the same phase, and are in different phases from the wavy flow grooves of the fuel gas flow field and the wavy flow grooves of the oxygen-containing gas flow field of the first power generation unit.

Further, in a fuel cell disclosed in Japanese Patent No. 3,599,280, a wavy fuel gas flow field including a plurality of flow grooves is formed in a surface of the metal separator facing an anode, for allowing the fuel gas to flow along an electrode surface of the anode in a wavy pattern, and a wavy oxygen-containing gas flow field including a plurality of flow grooves is formed in a surface of the metal separator facing a cathode, for allowing the oxygen-containing gas to flow along an electrode surface of the cathode in a wavy pattern.

The phase of the wavy reactant gas flow field (fuel gas flow field) of one of the adjacent fuel cells and the phase of the wavy reactant gas flow field (oxygen-containing gas flow field) of the other of the adjacent fuel cells are different. Therefore, the back surface of the wavy reactant gas flow field of the metal separator of one of the adjacent fuel cells and the back surface of the wavy reactant gas flow field of the metal separator of the other of the adjacent fuel cells are stacked together to form a coolant flow field between these back surfaces.

SUMMARY OF INVENTION

In Japanese Laid-Open Patent Publication No. 2009-301996, for example, the first fuel gas flow field of the first power generation unit and the second fuel gas flow field of the second power generation unit are in different phases (reverse phases) from each other. In the structure, an end of the first fuel gas flow field and an end of the second fuel gas flow field each terminated adjacent to the fuel gas passage (fuel gas supply passage or fuel gas discharge passage) extending in the stacking direction of the fuel cell stack are not in alignment with each other in the stacking direction.

For example, as shown in FIG. 29, a first fuel gas flow field 1a and a second fuel gas flow field 1b are provided in reverse phases with respect to each other. A fuel gas supply passage 2 extends through the fuel cell in the stacking direction. Fuel gases 3a, 3b are supplied from the fuel gas supply passage 2 to the first fuel gas flow field 1a and the second fuel gas flow field 1b, respectively.

In this regard, the end of the first fuel gas flow field 1a and the end of the second fuel gas flow field 1b are terminated at different positions in the stacking direction, i.e., in different states (distance or orientation) from the fuel gas supply passage 2. Therefore, the flow distribution in the fuel gas and the pressure loss may be different, and the power generation performance may be different between the first fuel gas flow field 1a and the second fuel gas flow field 1b.

The present invention has been made to solve the problems of this type, and an object of the present invention is to provide a fuel cell stack having simple structure in which it is possible to suppress variation in the gas flow distribution or pressure loss as much as possible, and suitably improve the power generation performance.

Further, the present invention has been made in relation to a fuel cell stack formed by stacking two types of fuel cells having flow fields of different phases, and an object of the present invention is to provide a fuel cell stack having simple structure in which it is possible to suppress a large load from being applied to metal separators locally, and improve the power generation performance suitably.

A fuel cell stack according to the present invention is formed by stacking a first power generation unit and a second power generation unit together. Each of the first power generation unit and the second power generation unit comprises a membrane electrode assembly and a metal separator, which are stacked. The membrane electrode assembly includes an anode, a cathode, and an electrolyte membrane interposed between the anode and the cathode. A wavy fuel gas flow field including a plurality of flow grooves configured to allow a fuel gas to flow along an electrode surface of the anode in a wavy pattern and a wavy oxygen-containing gas flow field including a plurality of flow grooves configured to allow an oxygen-containing gas to flow along an electrode surface of the cathode in a wavy pattern are formed in each of the first power generation unit and the second power generation unit.

In the first power generation unit, the wavy fuel gas flow field and the wavy oxygen-containing gas flow field are in the same phase on both sides of the membrane electrode assembly. In the second power generation unit, the wavy fuel gas flow field and the wavy oxygen-containing gas flow field are in the same phase on both sides of the membrane electrode assembly, but the phase is different from the phase of the wavy fuel gas flow field and the wavy oxygen-containing gas flow field of the first power generation unit. The first power generation unit and the second power generation unit are stacked together to form a coolant flow field between a back surface of the wavy fuel gas flow field and a back surface of the wavy oxygen-containing gas flow field in the different phases from each other, configured to allow a coolant to flow through the coolant flow field.

Further, at least one end of the wavy fuel gas flow field and at least one end of the wavy oxygen-containing gas flow field are terminated at a central portion of a width of amplitude of a waveform.

Further, in a fuel cell stack according to the present invention, a flow field end part of a flow field inlet end or a flow field outlet end of the wavy fuel gas flow field of the first power generation unit including the back surface forming the coolant flow field and a flow field end part of a flow field inlet end or a flow field outlet end of the wavy oxygen-containing gas flow field of the second power generation unit including the back surface forming the coolant flow field, are positioned in alignment with each other as viewed in a stacking direction.

In the present invention, at least one end of the wavy fuel gas flow field is terminated at the central portion of the width of the amplitude of the waveform. Therefore, even if the wavy fuel gas flow field of the first power generation unit and the wavy fuel gas flow field of the second power generation unit are in different phases (reverse phases) from each other, one end of the wavy fuel gas flow field of the first power generation unit and one end of the wavy fuel gas flow field of the second power generation unit are overlapped with each other in the stacking direction. Thus, it is possible to suppress variation in the flow distribution of the fuel gas and the pressure loss as much as possible between the wavy fuel gas flow field of the first power generation unit and the wavy fuel gas flow field of the second power generation unit.

Likewise, at least one end of the wavy oxygen-containing gas flow field is terminated at the central portion of the width of the amplitude of the waveform. Therefore, even if the wavy oxygen-containing gas flow field of the first power generation unit and the wavy oxygen-containing gas flow field of the second power generation unit are in different phases (reverse phases) from each other, one end of the wavy oxygen-containing gas flow field of the first power generation unit and one end of the wavy oxygen-containing gas flow field of the second power generation unit are overlapped with each other in the stacking direction. Thus, it is possible to suppress variation in the flow distribution of the oxygen-containing gas and the pressure loss as much as possible between the wavy oxygen-containing gas flow field of the first power generation unit and the wavy oxygen-containing gas flow field of the second power generation unit.

Accordingly, with the simple structure, it becomes possible to suppress variation in the gas flow distribution and the pressure loss as much as possible, and improve the power generation performance suitably.

Further, in the present invention, a flow field end part of a flow field inlet end or a flow field outlet end (flow field end) of the wavy fuel gas flow field of the first power generation unit and a flow field end part of a flow field inlet end or a flow field outlet end (flow field end) of the wavy oxygen-containing gas flow field of the second power generation unit, are positioned in alignment with each other as viewed in the stacking direction. In the structure, the back surfaces of the flow field ends forming the coolant flow field are spaced from each other in the stacking direction. Therefore, for example, when a load in the stacking direction is applied to the fuel cell stack, a gap formed between the metal separators is contracted to reduce the load. Thus, it is possible to reliably suppress generation of the excessive surface pressure. Accordingly, with the simple structure, it becomes possible to suppress a large load from being applied to the metal separators locally, and improve the power generation performance suitably.

Further, it is possible to suppress variation in the flow distribution of the fuel gas and the pressure loss as much as possible between the wavy fuel gas flow field of the first power generation unit and the wavy fuel gas flow field of the second power generation unit. Likewise, it is possible to suppress variation in the gas flow distribution of the oxygen-containing gas and the pressure loss as much as possible between the wavy oxygen-containing gas flow field of the first power generation unit and the wavy oxygen-containing gas flow field of the second power generation unit. Accordingly, with the simple structure, it becomes possible to suppress variation in the gas flow distribution and the pressure loss as much as possible, and improve the power generation performance suitably.

DESCRIPTION OF EMBODIMENTS

Figure 1:
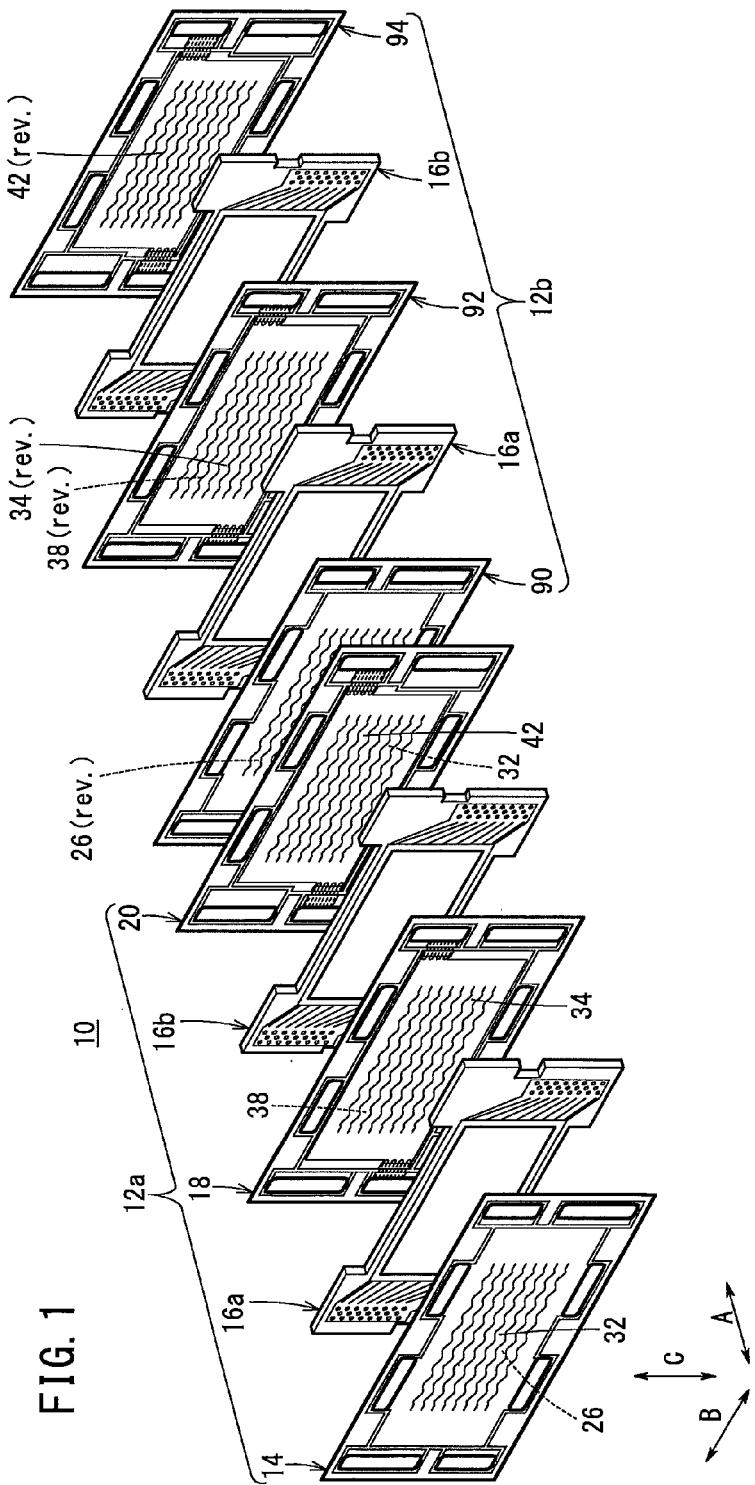
FIG. 1 is an exploded perspective view showing main components of a fuel cell stack according to a first embodiment of the present invention.

As shown in FIG. 1, a fuel cell stack 10 according to the first embodiment of the present invention is formed by stacking first power generation units 12a and second power generation units 12b alternately in a horizontal direction indicated by an arrow A. For example, the fuel cell stack 10 is mounted in a fuel cell electric vehicle (not shown).

Figure 2:
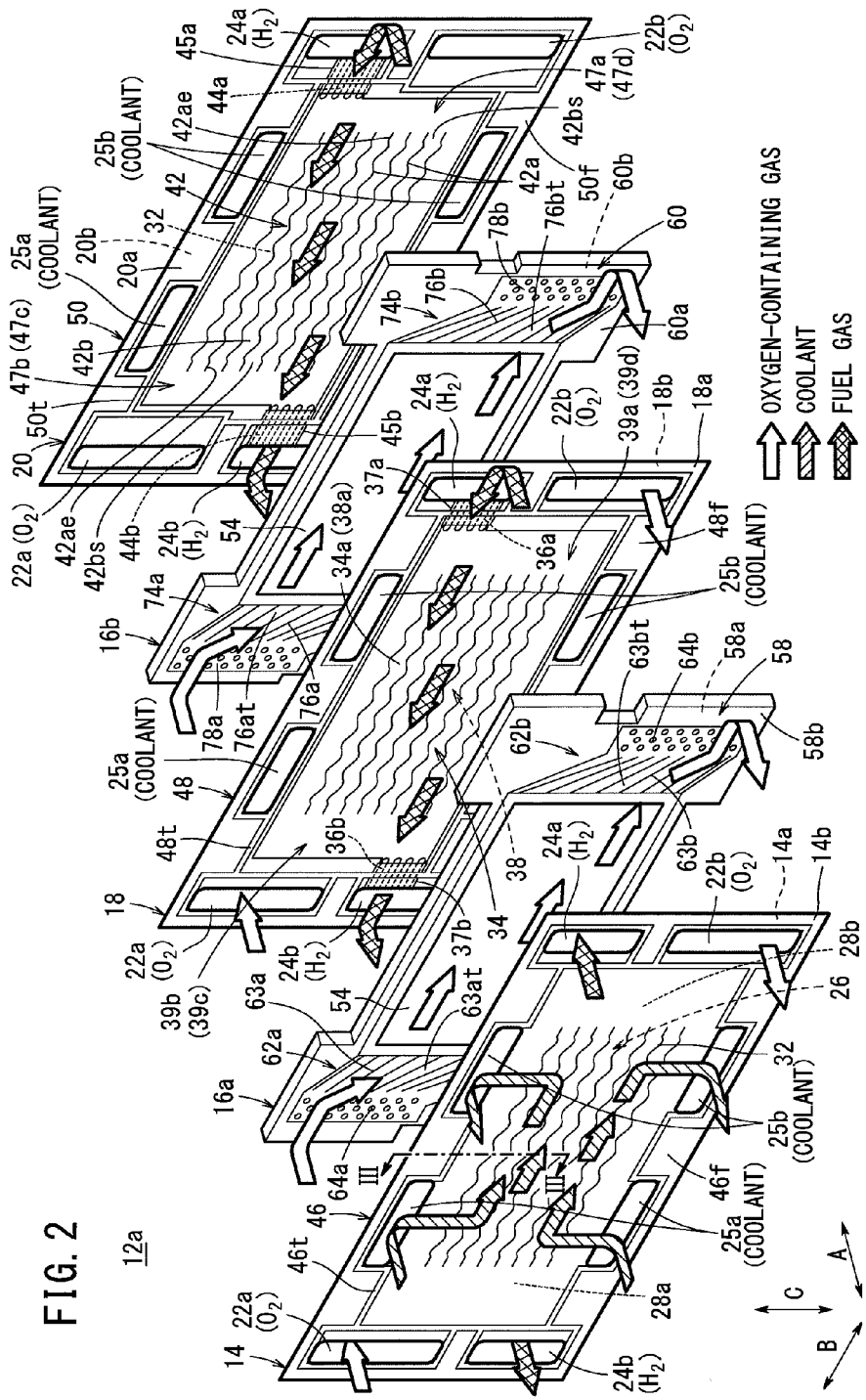
FIG. 2 is an exploded perspective view showing main components of a first power generation unit of the fuel cell stack.
Figure 3:
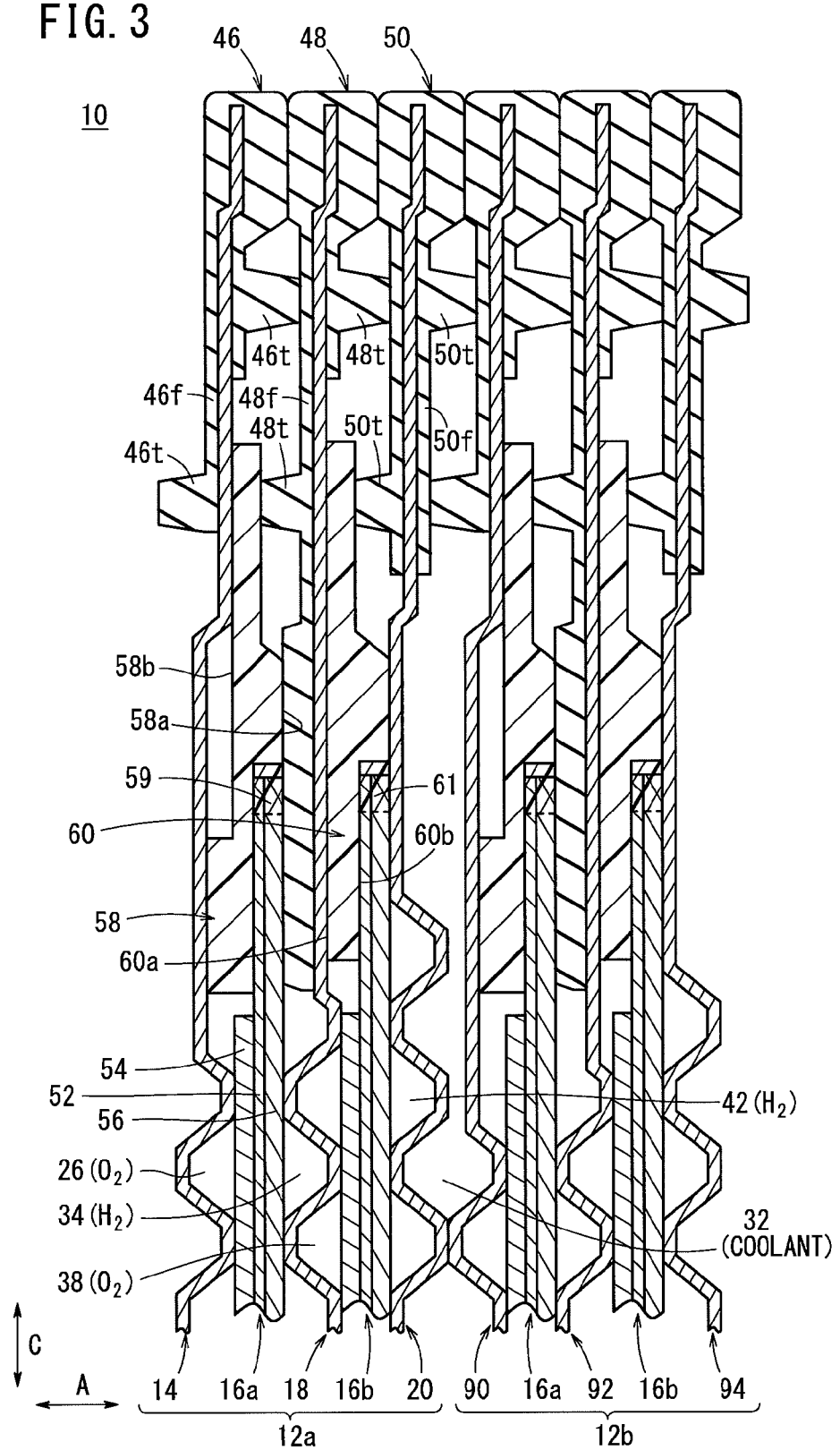
FIG. 3 is a cross sectional view showing the fuel cell stack, taken along a line III-III in FIG. 2.

As shown in FIGS. 2 and 3, the first power generation unit 12a includes a first metal separator 14, a first membrane electrode assembly (MEA) 16a, a second metal separator 18, a second membrane electrode assembly (MEA) 16b, and a third metal separator 20. The first power generation unit 12a may be formed by three MEAs and four metal separators, or may be formed by sandwiching one MEA between a pair of metal separators. The second power generation unit 12b described later may also be formed by such MEAs and metal separators.

For example, the first metal separator 14, the second metal separator 18, and third metal separator 20 are made of metal plates such as steel plates, stainless steel plates, aluminum plates, or plated steel sheets. The first metal separator 14, the second metal separator 18, and the third metal separator 20 have a rectangular shape in a plan view, and are formed by corrugating metal thin plates by press forming to have corrugated shapes in cross section. As the separators, carbon separators may be used instead of the first metal separator 14, the second metal separator 18, and the third metal separator 20.

As shown in FIG. 2, at ends of the first metal separator 14, the second metal separator 18, and the third metal separator 20 in a longitudinal direction indicated by an arrow B, an oxygen-containing gas supply passage 22a and a fuel gas discharge passage 24b are provided. The oxygen-containing gas supply passage 22a extends through the first metal separator 14, the second metal separator 18, and the third metal separator 20 in the direction indicated by an arrow A, and supplies an oxygen-containing gas. The fuel gas discharge passage 24b extends through the first metal separator 14, the second metal separator 18, and the third metal separator 20 in the direction indicated by the arrow A, and discharges a fuel gas such as a hydrogen-containing gas.

At other ends of the first metal separator 14, the second metal separator 18, and the third metal separator 20 in the longitudinal direction indicated by the arrow B, a fuel gas supply passage 24a and an oxygen-containing gas discharge passage 22b are provided. The fuel gas supply passage 24a and the oxygen-containing gas discharge passage 22b extend through the first metal separator 14, the second metal separator 18, and the third metal separator 20 in the direction indicated by the arrow A. The fuel gas supply passage 24a supplies the fuel gas, and the oxygen-containing gas discharge passage 22b discharges the oxygen-containing gas.

At both marginal ends of the first metal separator 14, the second metal separator 18, and the third metal separator 20 in a short-side direction indicated by an arrow C, a pair of coolant supply passages 25a are provided at upper and lower positions, on a side closer to the oxygen-containing gas supply passage 22a. The pair of coolant supply passages 25a extends through the first metal separator 14, the second metal separator 18, and the third metal separator 20 in the direction indicated by the arrow A for supplying a coolant. At both marginal ends of the first metal separator 14, the second metal separator 18, and the third metal separator 20 in the short-side direction indicated by the arrow C, a pair of coolant discharge passages 25b are provided at upper and lower positions, on a side closer to the fuel gas supply passage 24a for discharging a coolant.

Figure 4:
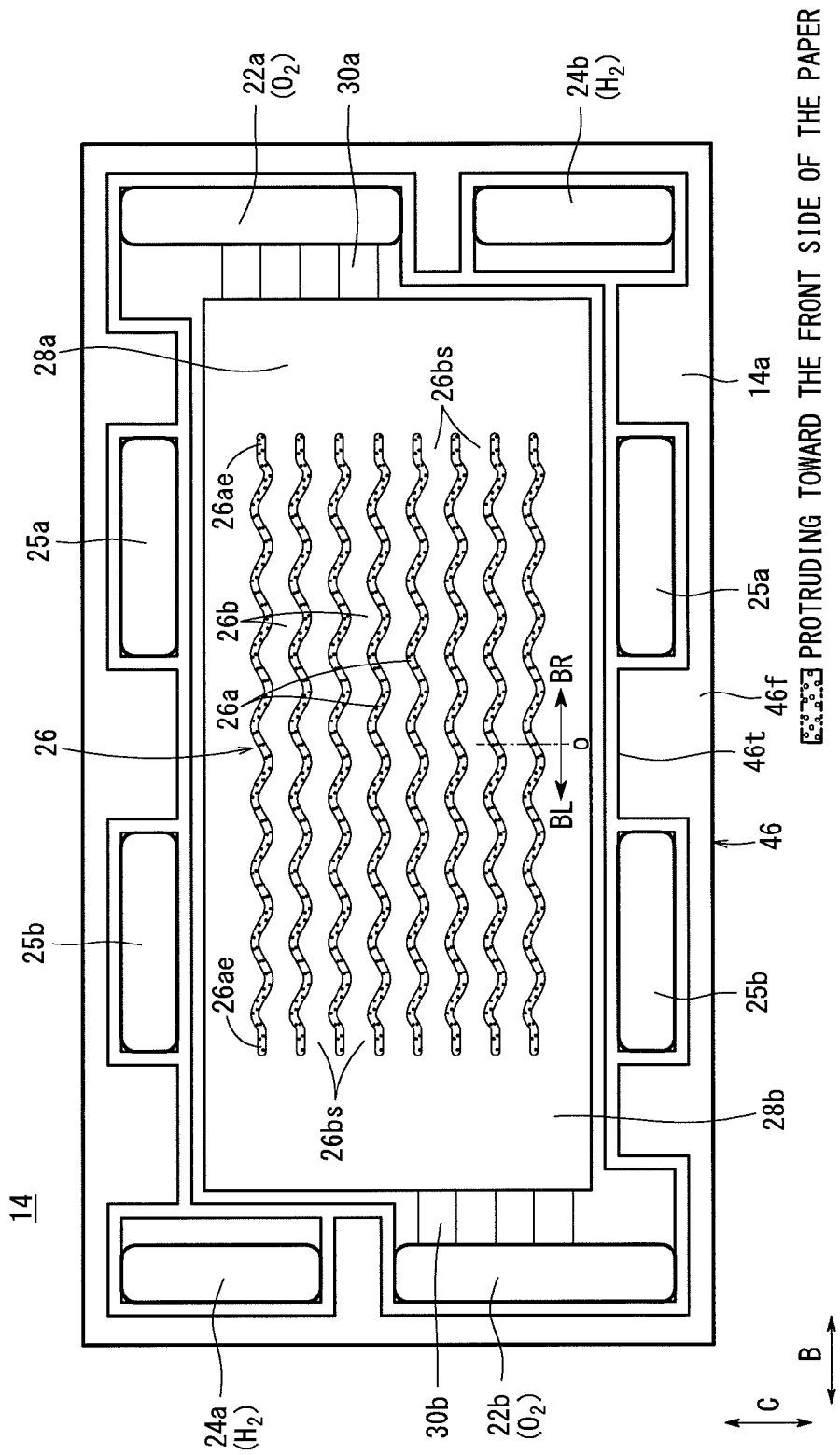
FIG. 4 is a view showing one surface of a first metal separator of the first power generation unit.

As shown in FIG. 4, the first metal separator 14 has a first oxygen-containing gas flow field 26 on its surface 14a facing the first membrane electrode assembly 16a. The first oxygen-containing gas flow field 26 is connected to the oxygen-containing gas supply passage 22a and the oxygen-containing gas discharge passage 22b.

The first oxygen-containing gas flow field 26 includes a plurality of wavy protrusions (protrusions having a wavy shape such as a sine wave shape or a zigzag shape in a plan view) 26a protruding toward the surface 14a, and extending in the direction indicated by the arrow B. A plurality of wavy flow grooves 26b recessed toward a surface 14b are formed between the wavy protrusions 26a. At least one end (in the embodiment, both ends) of each of the wavy protrusions 26a forms a straight protrusion 26ae.

As shown in FIG. 4, each of the wavy protrusions 26a has a laterally asymmetrical shape. In the wavy protrusion 26a, four lower ridges are provided from the center o of the lower ridge toward the right side (in a direction indicated by an arrow BR), and the four lower ridges are provided from the center o of the lower ridge toward the left side (in a direction indicated by an arrow BL). It should be noted that each of the flow fields describe later has the same structure.

Figure 5:
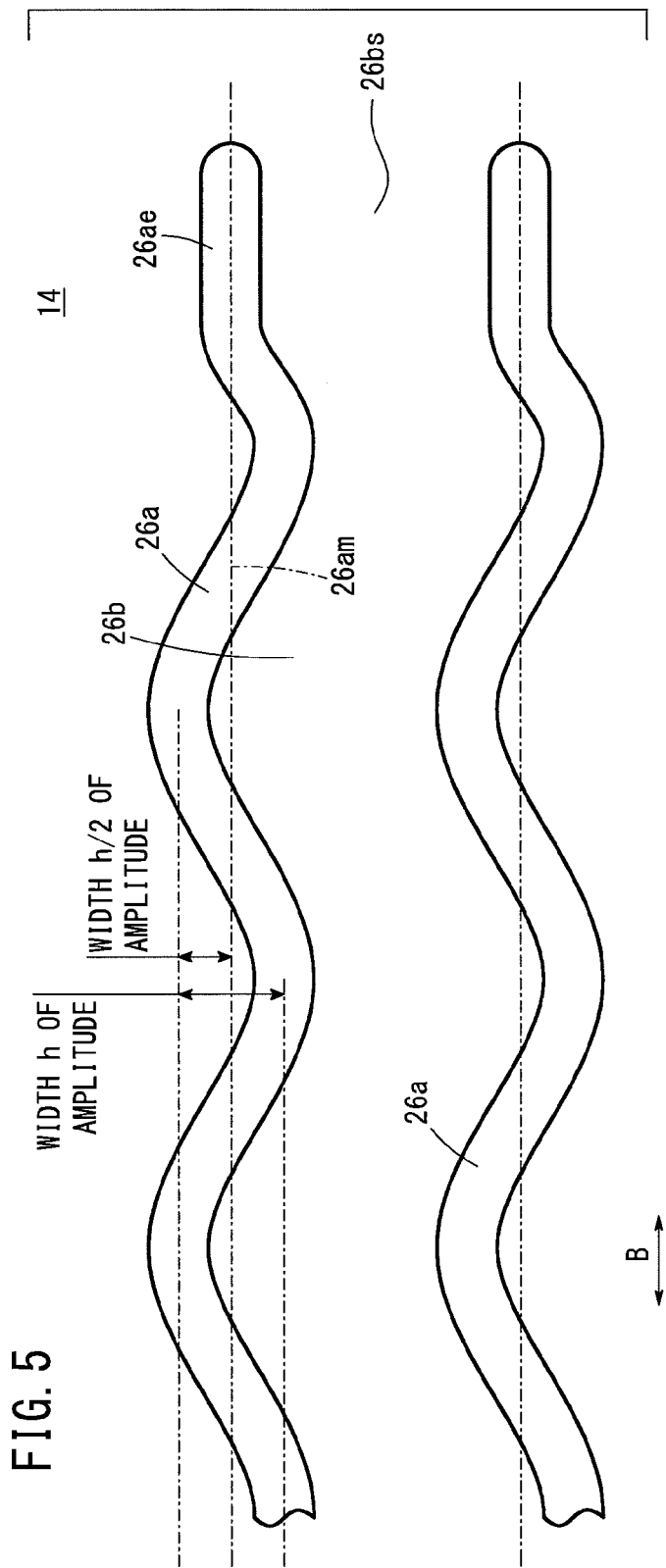
FIG. 5 is an enlarged view showing a main part of the first metal separator.

As shown in FIG. 5, the straight protrusions 26*ae* extend straight in a wavelength direction indicated by the arrow B along a central portion 26*am* of the width h of the amplitude of the waveform of the wavy protrusions 26*a* at a certain pitch. A straight flow groove 26*bs* is present between the adjacent straight protrusions 26*ae*. The straight flow groove 26*bs* forms an end of the wavy flow groove 26*b*, and extends straight in the wavelength direction from the central portion of the width of the amplitude of the waveform.

As shown in FIG. 4, flat sections 28*a*, 28*b* are provided adjacent to the inlet and the outlet of the first oxygen-containing gas flow field 26. A plurality of inlet connection grooves 30*a* are formed as a bridge between the flat section 28*a* and the oxygen-containing gas supply passage 22*a*. A plurality of outlet connection grooves 30*b* are formed as a bridge between the flat section 28*b* and the oxygen-containing gas discharge passage 22*b*.

As shown in FIG. 2, a coolant flow field 32 is formed on the surface 14*b* of the first metal separator 14. The coolant flow field 32 is connected to the pair of coolant supply passages 25*a* and the pair of coolant discharge passages 25*b*. The coolant flow field 32 is formed by stacking the back surface of the first oxygen-containing gas flow field 26 and the back surface of a second fuel gas flow field 42 described later together.

Figure 6:
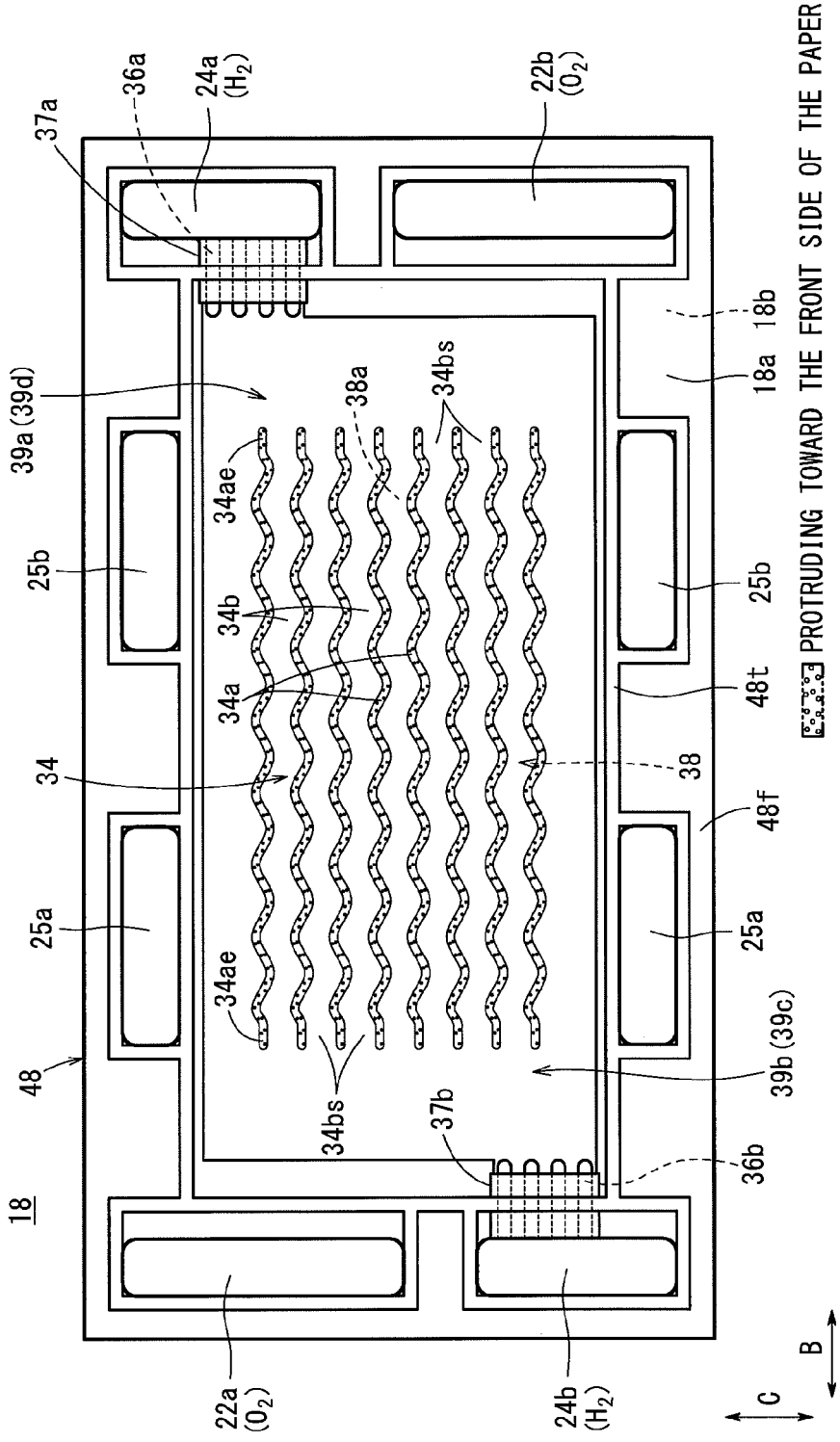
FIG. 6 is a view showing one surface of a second metal separator of the first power generation unit.

As shown in FIG. 6, the second metal separator 18 has a first fuel gas flow field 34 on its surface 18*a* facing the first membrane electrode assembly 16*a*. The first fuel gas flow field 34 is connected to the fuel gas supply passage 24*a* and the fuel gas discharge passage 24*b*. The first fuel gas flow field 34 includes a plurality of wavy protrusions (protrusions having a wavy shape such as a sine wave shape or a zigzag shape in a plan view) 34*a* protruding toward the surface 18*a*, and extending in the direction indicated by the arrow B. A plurality of wavy flow grooves 34*b* are formed between the wavy protrusions 34*a*. At least one end (in the embodiment, both ends) of each of the wavy protrusions 34*a* forms a straight protrusion 34*ae*.

The straight protrusions 34*ae* extend straight in the wavelength direction indicated by the arrow B along the central portion of the width of the amplitude of the waveform of the wavy protrusions 34*a* at a certain pitch. A straight flow groove 34*bs* is present between the adjacent straight protrusions 34*ae*. The straight flow groove 34*bs* forms an end of the wavy flow groove 34*b*, and extends straight in the wavelength direction from the central portion of the width of the amplitude of the waveform.

A plurality of supply connection channels 36*a* are formed adjacent to the fuel gas supply passage 24*a*, and a plurality of discharge connection channels 36*b* are formed adjacent to the fuel gas discharge passage 24*b*. The supply connection channels 36*a* are covered by a lid member 37*a*, and the discharge connection channels 36*b* are covered by a lid member 37*b*. Flat sections 39*a* and 39*b* are provided adjacent to the inlet and the outlet of the first fuel gas flow field 34.

Figure 7:
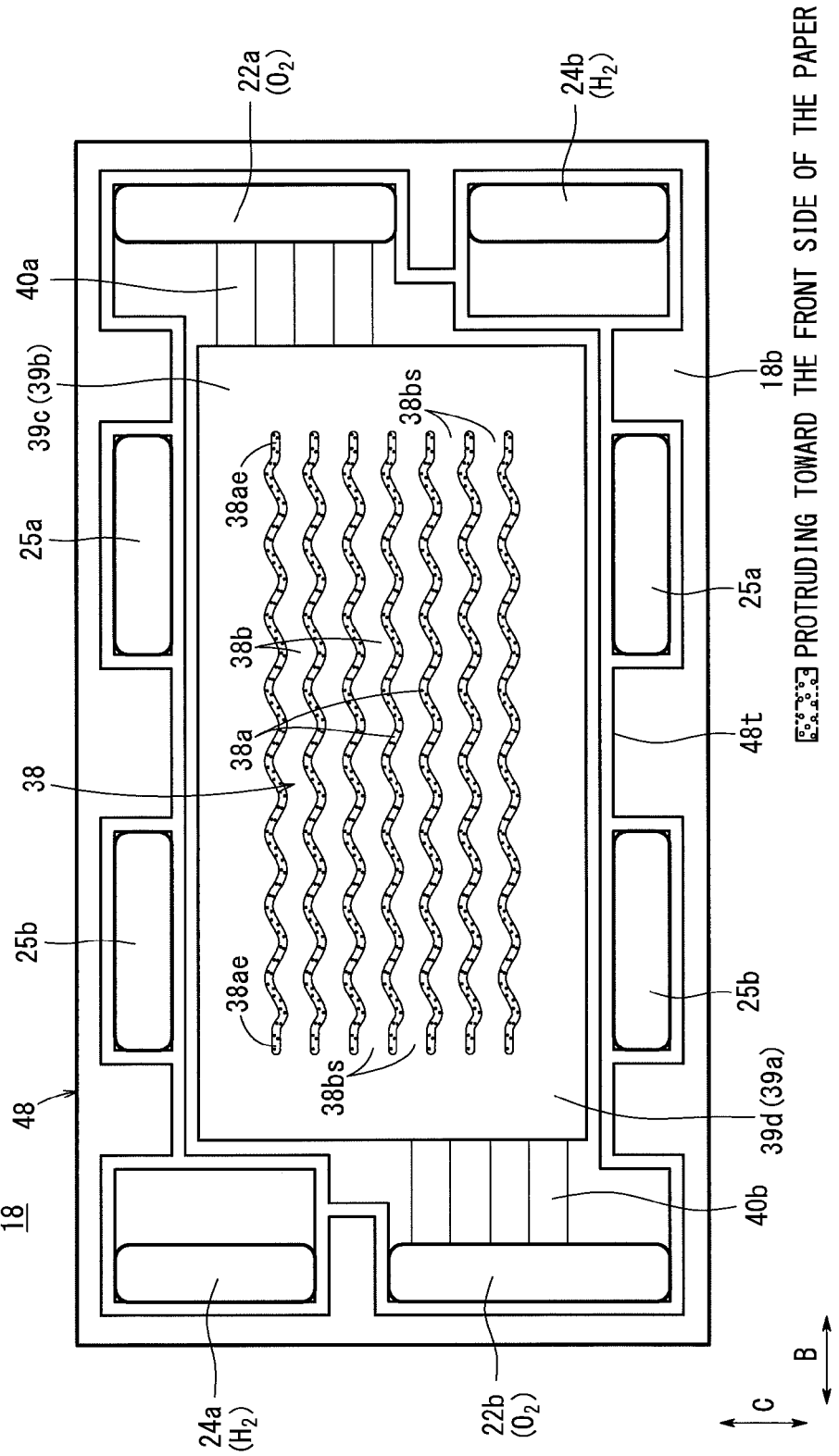
FIG. 7 is a view showing the other surface of the second metal separator.

As shown in FIG. 7, the second metal separator 18 has a second oxygen-containing gas flow field 38 on its surface 18*b* facing the second membrane electrode assembly 16*b*. The second oxygen-containing gas flow field 38 is connected to the oxygen-containing gas supply passage 22*a* and the oxygen-containing gas discharge passage 22*b*.

The second oxygen-containing gas flow field 38 includes a plurality of wavy protrusions (protrusions having a wavy shape such as a sine wave shape or a zigzag shape in a plan view) 38*a* protruding toward the surface 18*b*, and extending in the direction indicated by the arrow B. A plurality of wavy flow grooves 38*b* are formed between the wavy protrusions 38*a*. At least one of the flow field inlet end and the flow field outlet end (in the first embodiment, both ends) of each wavy protrusion 38*a* forms a straight protrusion 38*ae*.

The straight protrusions 38*ae* extend straight in the wavelength direction indicated by the arrow B along the central portion of the width of the amplitude of the waveform of the wavy protrusions 38*a* at a certain pitch. A straight flow groove 38*bs* is present between the adjacent straight protrusions 38*ae*. The straight flow groove 38*bs* forms an end of the wavy flow groove 38*b*, and extends straight in the wavelength direction from the central portion of the width of the amplitude of the waveform.

Flat sections 39*c*, 39*d* are provided adjacent to the inlet and the outlet of the second oxygen-containing gas flow field 38. The flat sections 39*c* and 39*d* are back surfaces of the flat sections 39*b* and 39*a*. A plurality of inlet connection grooves 40*a* are formed between the flat section 39*c* and the oxygen-containing gas supply passage 22*a*. A plurality of outlet connection grooves 40*b* are formed between the flat section 39*d* and the oxygen-containing gas discharge passage 22*b*.

As shown in FIG. 2, the third metal separator 20 has a second fuel gas flow field 42 on its surface 20*a* facing the second membrane electrode assembly 16*b*. The second fuel gas flow field 42 is connected to the fuel gas supply passage 24*a* and the fuel gas discharge passage 24*b*. The second fuel gas flow field 42 includes a plurality of wavy protrusions (protrusions having a wavy shape such as a sine wave shape or a zigzag shape in a plan view) 42*a* protruding toward the surface 20*a*, and extending in the direction indicated by the arrow B. A plurality of wavy flow grooves 42*b* are formed between the wavy protrusions 42*a*. At least one of the flow field inlet end and the flow field outlet end (in the first embodiment, both ends) of each wavy protrusion 42*a* forms a straight protrusion 42*ae*.

The straight protrusions 42*ae* extend straight in the wavelength direction indicated by the arrow B along the central portion of the width of the amplitude of the waveform of the wavy protrusions 42*a* at a certain pitch. A straight flow groove 42*bs* is present between the adjacent straight protrusions 42*ae*. The straight flow groove 42*bs* forms an end of the wavy flow groove 42*b*, and extends straight in the wavelength direction from the central portion of the width of the amplitude of the waveform.

A plurality of supply connection channels 44*a* are formed adjacent to the fuel gas supply passage 24*a*, and a plurality of discharge connection channels 44*b* are formed adjacent to the fuel gas discharge passage 24*b*. The supply connection channels 44*a* are covered by a lid member 45*a*, and the discharge connection channels 44*b* are covered by a lid member 45*b*. Flat sections 47*a*, 47*b* are provided adjacent to the inlet and the outlet of the second fuel gas flow field 42, respectively.

The coolant flow field 32 is partially formed on a surface 20*b* of the third metal separator 20, i.e., on the back surface of the second fuel gas flow field 42. The surface 14*b* of the first metal separator 14 adjacent to the third metal separator 20 is stacked on the surface 20*b* of the third metal separator 20 to form the coolant flow field 32 between the surface 20*b* of the third metal separator 20 and the surface 14*b* of the first metal separator 14. Flat sections 47*c* and 47*d* are provided adjacent to the inlet and the outlet of the coolant flow field 32. The flat sections 47*d* and 47*c* are back surfaces of the flat sections 47*a* and 47*b*, respectively.

In the first power generation unit 12*a*, the waveforms of the first oxygen-containing gas flow field 26, the first fuel gas flow field 34, the second oxygen-containing gas flow field 38, and the second fuel gas flow field 42 are in the same phase in the stacking direction. Each of the waveforms has the same wave pitch, and the same amplitude.

A first seal member 46 is formed on the surfaces 14*a*, 14*b* of the first metal separator 14, around the outer end of the first metal separator 14. A second seal member 48 is formed on the surfaces 18*a*, 18*b* of the second metal separator 18, around the outer end of the second metal separator 18. A third seal member 50 is formed on the surfaces 20*a*, 20*b* of the third metal separator 20, around the outer end of the third metal separator 20.

Each of the first seal member 46, the second seal member 48, and the third seal member 50 is an elastic seal member made of a seal material, a cushion material, or a packing material such as an EPDM (Ethylene Propylene Diene Monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

The first seal member 46 has a flat seal (seal base) 46*f* having a flat surface along the surface of the first metal separator 14. As shown in FIGS. 2 and 4, a ridge seal 46*t* is formed integrally with the flat seal 46*f* of the first seal member 46.

The second seal member 48 has a flat seal (seal base) 48*f* having a flat surface along the surface of the second metal separator 18. As shown in FIGS. 2 and 6, a ridge seal 48*t* is formed integrally with the flat seal 48*f* of the second seal member 48.

The third seal member 50 has a flat seal (seal base) 50*f* having a flat surface along the surface of the third metal separator 20. A ridge seal 50*t* is formed integrally with the flat seal 50*f* of the third seal member 50.

As shown in FIG. 3, each of the first membrane electrode assembly 16*a* and the second membrane electrode assembly 16*b* includes a solid polymer electrolyte membrane 52. The solid polymer electrolyte membrane 52 is formed by impregnating a thin membrane of perfluorosulfonic acid with water, for example. The solid polymer electrolyte membrane 52 is interposed between a cathode 54 and an anode 56.

The size of the cathode 54 is smaller than the sizes of the anode 56 and the solid polymer electrolyte membrane 52 in a plan view, i.e., the cathode 54, the anode 56, and the solid polymer electrolyte membrane 52 form an MEA having different sizes (stepped type) of components. It should be noted that the cathode 54, the anode 56, and the solid polymer electrolyte membrane 52 may have the same size in a plan view. Alternatively, the size of the anode 56 may be smaller than the sizes of the cathode 54 and the solid polymer electrolyte membrane 52 in a plan view.

Each of the cathode 54 and the anode 56 has a gas diffusion layer (not shown) such as a carbon paper, and an electrode catalyst layer (not shown) of platinum alloy supported on porous carbon particles. The carbon particles are deposited on the surface of the gas diffusion layer. The electrode catalyst layers are formed on both surfaces of the solid polymer electrolyte membrane 52, respectively.

As shown in FIGS. 2 and 3, in the first membrane electrode assembly 16*a*, a first resin frame member 58 is formed integrally with the outer end of the solid polymer electrolyte membrane 52, outside the outer end of the cathode 54. As shown in FIG. 3, the outer end of the solid polymer electrolyte membrane 52 and the first resin frame member 58 are formed integrally by impregnating the outer end of the solid polymer electrolyte membrane 52 and the first resin frame member 58, e.g., with adhesive (resin) in an impregnation portion 59.

A surface 58*a* of the first resin frame member 58 and the surface of the anode 56 (in effect, the gas diffusion layer) are positioned substantially in the same plane. It should be noted that a step may be present at an interface between the first resin frame member 58 and the anode 56 due to the presence of the impregnation portion 59. The first resin frame member 58 may be formed integrally with the outer end of the solid polymer electrolyte membrane 52 by injection molding.

Likewise, in the second membrane electrode assembly 16*b*, a second resin frame member 60 is formed integrally with the outer end of the solid polymer electrolyte membrane 52, outside the outer end of the cathode 54. As shown in FIG. 3, the outer end of the solid polymer electrolyte membrane 52 and the second resin frame member 60 are formed integrally by impregnating the outer end of the solid polymer electrolyte membrane 52 and the second resin frame member 60, e.g., with adhesive (resin) in an impregnation portion 61. The second resin frame member 60 may be formed integrally with the outer end of the solid polymer electrolyte membrane 52 by injection molding.

As the resin material of the first resin frame member 58 and the second resin frame member 60, for example, in addition to electrically insulating general purpose plastic, for example, engineering plastic, super engineering plastic or the like is adopted. For example, the first resin frame member 58 and the second resin frame member 60 may be made of films, etc.

As shown in FIG. 2, an inlet buffer 62*a* is provided on a surface 58*b* of the first resin frame member 58 between the oxygen-containing gas supply passage 22*a* and the inlet side of the first oxygen-containing gas flow field 26 (outside the power generation area), the surface 58*b* being on the cathode 54 side. An outlet buffer 62*b* is provided between the oxygen-containing gas discharge passage 22*b* and the outlet side of the first oxygen-containing gas flow field 26 (outside the power generation area). The power generation area herein means an area where electrode catalyst layers of both electrodes are provided on both sides of the solid polymer electrolyte membrane.

The inlet buffer 62*a* includes a plurality of linear inlet flow grooves 63*a* and a plurality of bosses 64*a*. The outlet buffer 62*b* includes a plurality of linear outlet flow grooves 63*b* and a plurality of bosses 64*b*. Each of the linear inlet flow grooves 63*a* is formed between linear protrusions 63*at*, and each of the linear outlet flow grooves 63*b* is formed between linear protrusions 63*bt*. It should be noted that the liner buffer 62*a* and the outlet buffer 62*b* may only include linear flow grooves or bosses.

Figure 8:
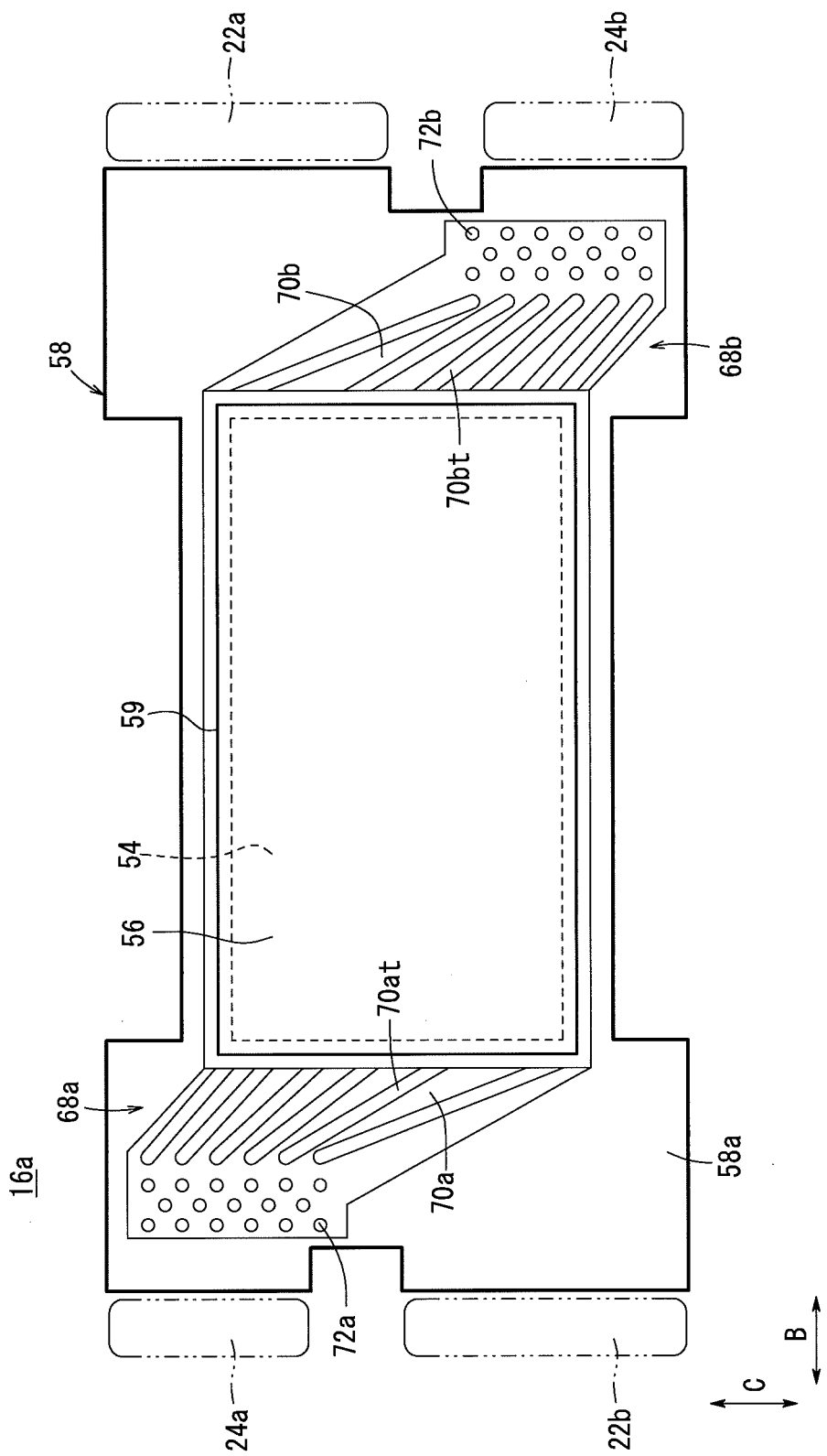
FIG. 8 is a front view showing a first membrane electrode assembly of the first power generation unit.

As shown in FIG. 8, an inlet buffer 68*a* is provided on a surface 58*a* of the first resin frame member 58 between the fuel gas supply passage 24*a* and the first fuel gas flow field 34 (outside the power generation area), the surface 58*a* being on the anode 56 side. An outlet buffer 68*b* is provided between the fuel gas discharge passage 24*b* and the first fuel gas flow field 34 (outside the power generation area).

The inlet buffer 68*a* includes a plurality of linear inlet flow grooves 70*a* and a plurality of bosses 72*a*. The outlet buffer 68*b* includes a plurality of linear outlet flow grooves 70*b* and a plurality of bosses 72*b*. Each of the linear inlet flow grooves 70*a* is formed between linear protrusions 70*at*, and each of the linear outlet flow grooves 70b is formed between linear protrusions 70bt.

As shown in FIG. 2, an inlet buffer 74a is provided on a surface 60a of the second resin frame member 60 between the oxygen-containing gas supply passage 22a and the second oxygen-containing gas flow field 38 (outside the power generation area), the surface 60a being on the cathode 54 side. An outlet buffer 74b is provided between the oxygen-containing gas discharge passage 22b and the second oxygen-containing gas flow field 38 (outside the power generation area).

The inlet buffer 74a includes a plurality of linear inlet flow grooves 76a and a plurality of bosses 78a. The outlet buffer 74b includes a plurality of linear outlet flow grooves 76b and a plurality of bosses 78b. Each of the linear inlet flow grooves 76a is formed between linear protrusions 76at, and each of the linear outlet flow grooves 76b is formed between linear protrusions 76bt.

Figure 9:
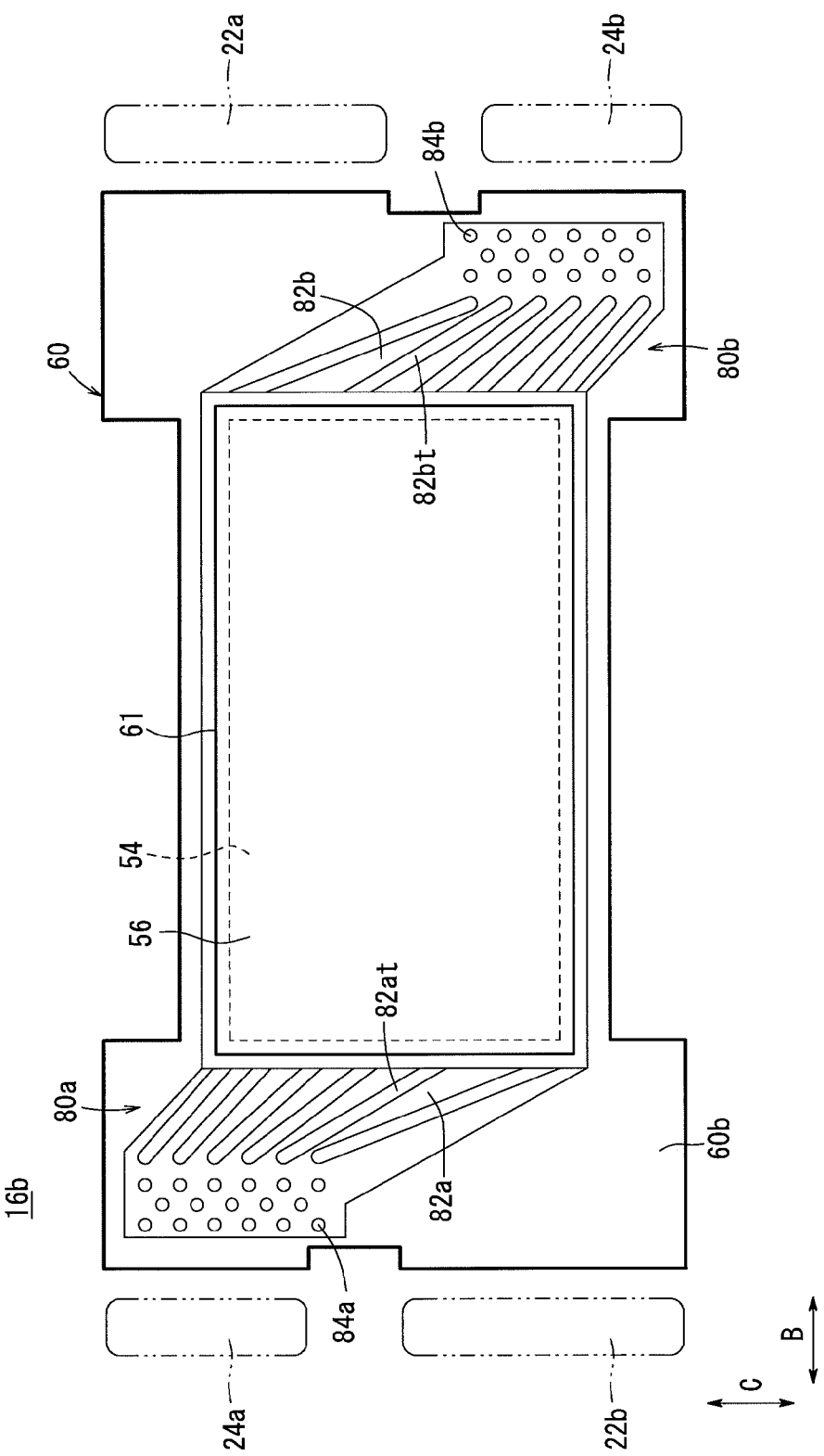
FIG. 9 is a front view showing a second membrane electrode assembly of the first power generation unit.

As shown in FIG. 9, an inlet buffer 80a is provided on a surface 60b of the second resin frame member 60 between the fuel gas supply passage 24a and the second fuel gas flow field 42 (outside the power generation area), the surface 60b being on the anode 56 side. An outlet buffer 80b is provided between the fuel gas discharge passage 24b and the second fuel gas flow field 42 (outside the power generation area).

The inlet buffer 80a includes a plurality of linear inlet flow grooves 82a and a plurality of bosses 84a. The outlet buffer 80b includes a plurality of linear outlet flow grooves 82b and a plurality of bosses 84b. Each of the linear inlet flow grooves 82a is formed between linear protrusions 82at, and each of the linear outlet flow grooves 82b is formed between linear protrusions 82bt.

Figure 10:
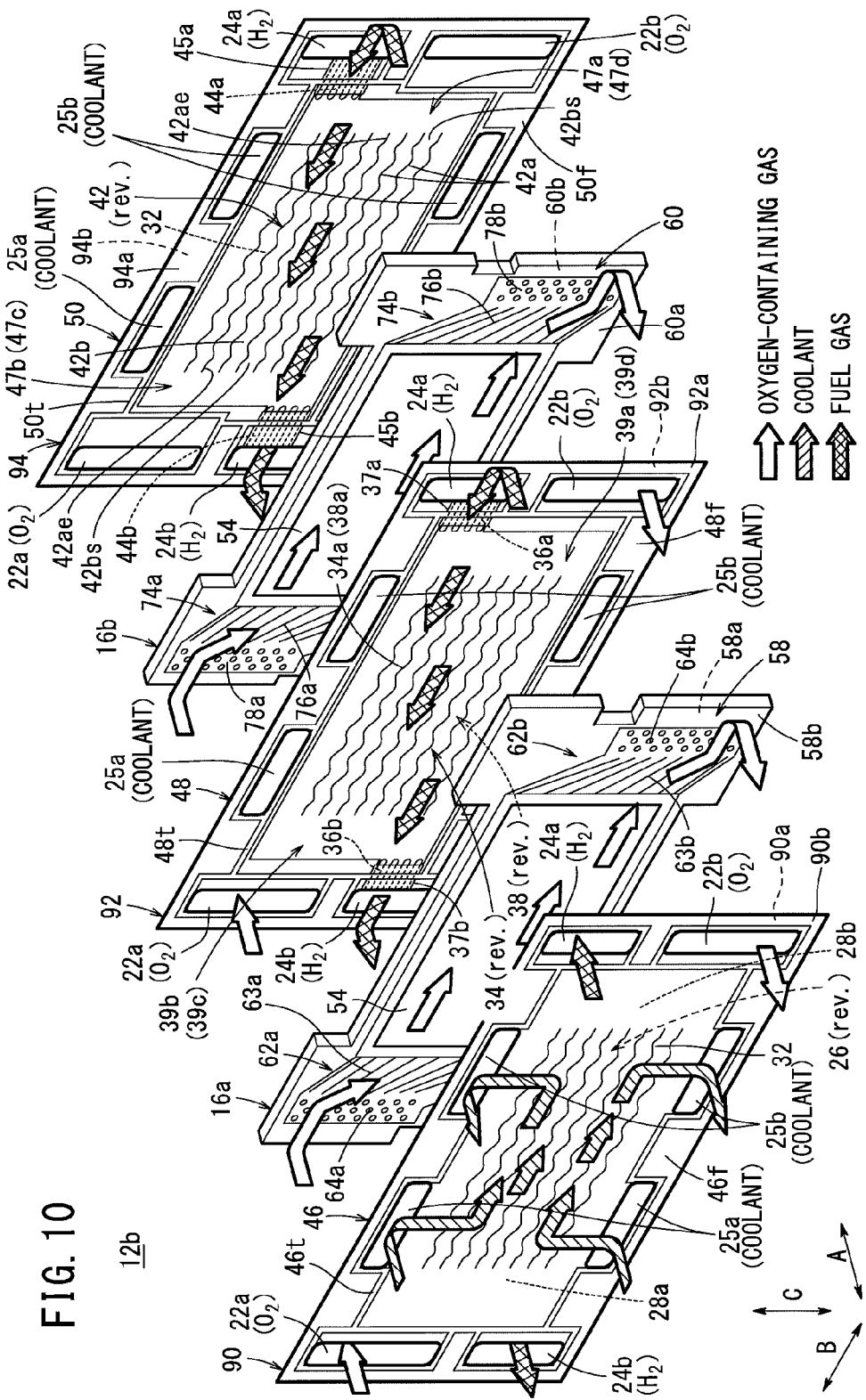
FIG. 10 is an exploded perspective view showing main components of a second power generation unit of the fuel cell stack.

As shown in FIGS. 1 and 10, the second power generation unit 12b includes a first metal separator 90, a first membrane electrode assembly 16a, a second metal separator 92, a second membrane electrode assembly 16b, and a third metal separator 94. The constituent elements that are identical to those of the first power generation unit 12a are labeled with the same reference numerals and detailed description thereof will be omitted.

Figure 11:
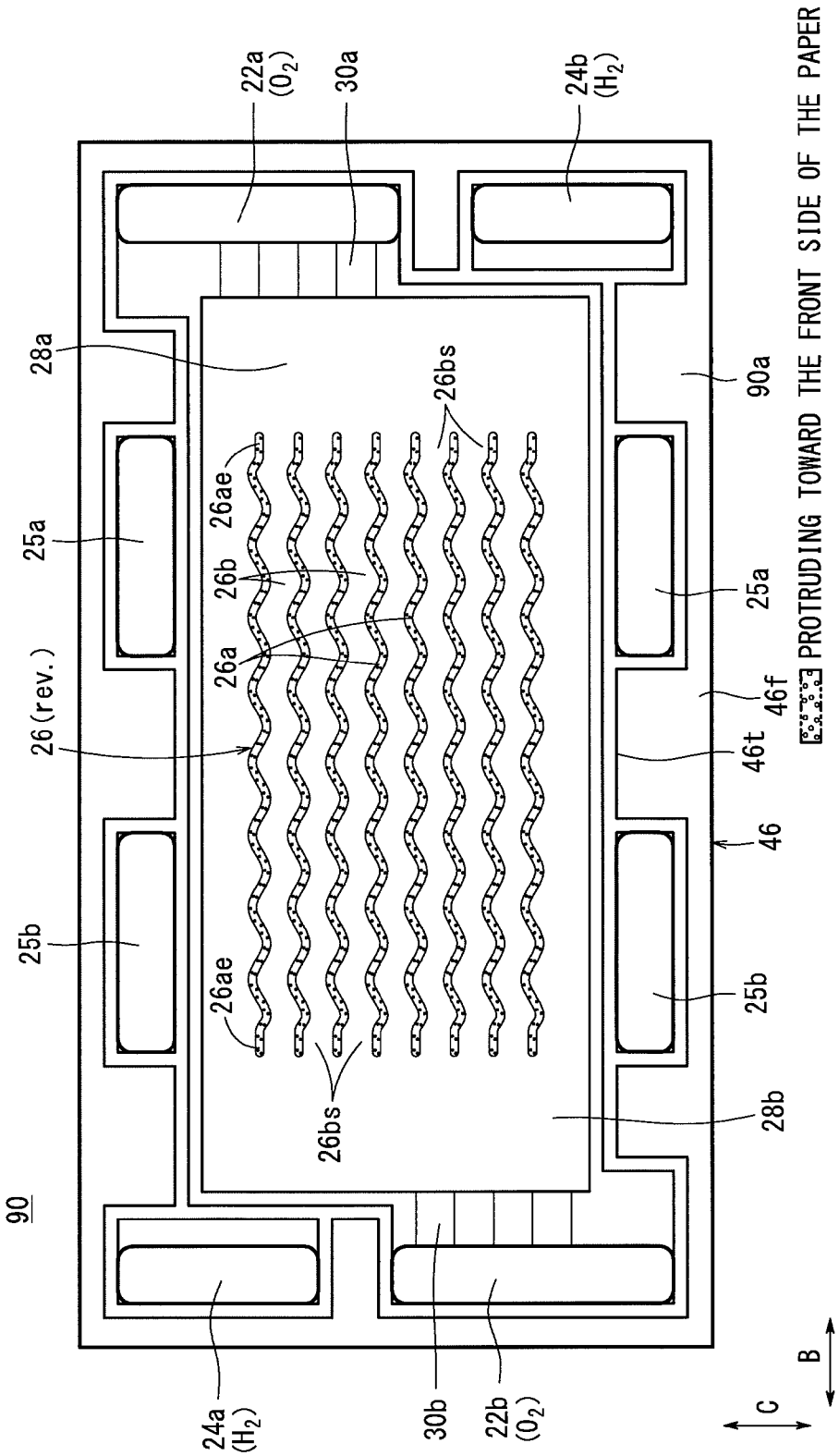
FIG. 11 is a view showing one surface of a first metal separator of the second power generation unit of the fuel cell stack.

As shown in FIG. 11, the first metal separator 90 has a first oxygen-containing gas flow field 26(rev.) on its surface 90a facing the first membrane electrode assembly 16a. The first oxygen-containing gas flow field 26 of the first power generation unit 12a and the first oxygen-containing gas flow field 26(rev.) of the second power generation unit 12b are in different phases (reverse phases) from each other, and have the same wave pitch and amplitude. The straight flow grooves 26bs of the first oxygen-containing gas flow field 26 (see FIG. 4) and the straight flow grooves 26bs of the first oxygen-containing gas flow field 26(rev.) (see FIG. 11) are overlapped in alignment with each other in the stacking direction. The straight flow grooves 26bs extend to a position where the straight flow grooves 26bs face the first resin frame member 58 and the second resin frame member 60 in the stacking direction.

Figure 12:
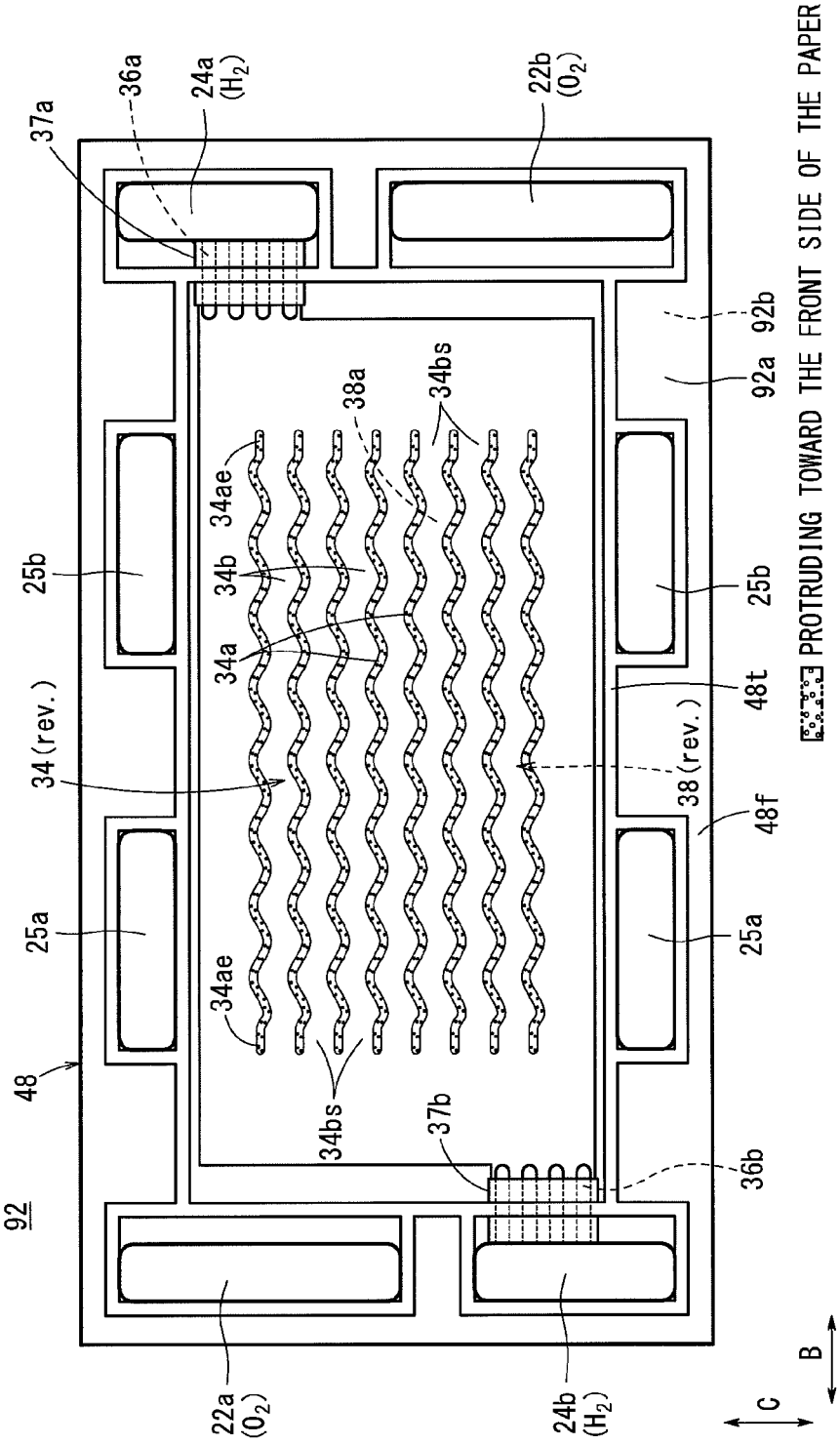
FIG. 12 is a view showing one surface of a second metal separator of the second power generation unit.

As shown in FIG. 12, the second metal separator 92 has a first fuel gas flow field 34(rev.) on its surface 92a facing the first membrane electrode assembly 16a. The first fuel gas flow field 34 of the first power generation unit 12a and the first fuel gas flow field 34(rev.) of the second power generation unit 12b are in different phases (reverse phases) from each other, and have the same wave pitch and amplitude. The straight flow grooves 34bs of the first fuel gas flow field 34 (see FIG. 6) and the straight flow grooves 34bs of the first fuel gas flow field 34(rev.) (see FIG. 12) are overlapped in alignment with each other in the stacking direction. The straight flow grooves 34bs extend to a position where the straight flow grooves 34bs face the first resin frame member 58 and the second resin frame member 60 in the stacking direction.

Figure 13:
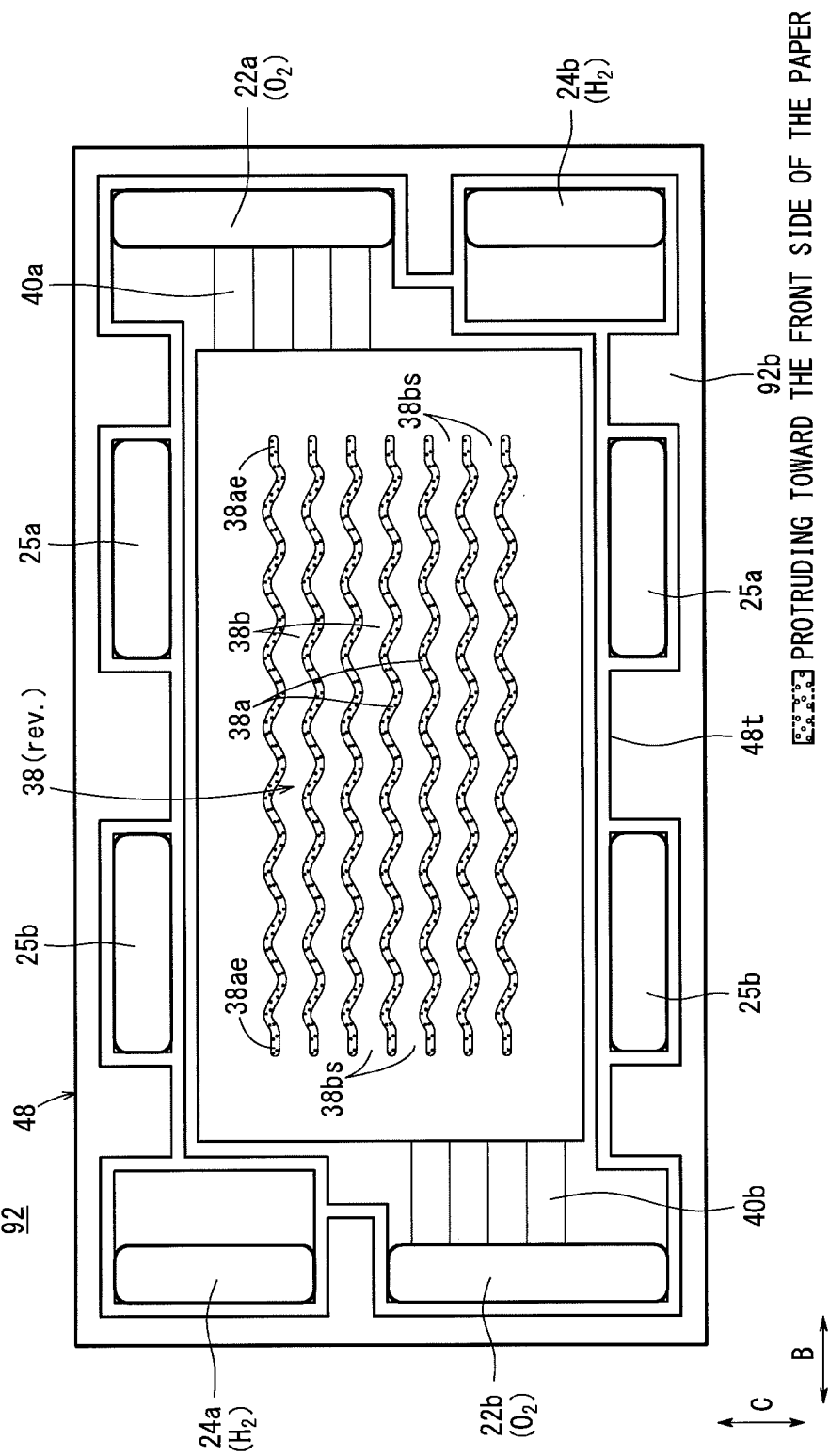
FIG. 13 is a view showing the other surface of the second metal separator.

As shown in FIG. 13, the second metal separator 92 has a second oxygen-containing gas flow field 38(rev.) on its surface 92b facing the second membrane electrode assembly 16b. The second oxygen-containing gas flow field 38 of the first power generation unit 12a and the second oxygen-containing gas flow field 38(rev.) of the second power generation unit 12b are in different phases (reverse phases) from each other, and have the same wave pitch and amplitude. The straight flow grooves 38bs of the second oxygen-containing gas flow field 38 (see FIG. 7) and the straight flow grooves 38bs of the second oxygen-containing gas flow field 38(rev.) (see FIG. 13) are overlapped in alignment with each other in the stacking direction. The straight flow grooves 38bs extend to a position where the straight flow grooves 38bs face the first resin frame member 58 and the second resin frame member 60 in the stacking direction.

As shown in FIG. 10, the third metal separator 94 has a second fuel gas flow field 42(rev.) on its surface 94a facing the second membrane electrode assembly 16b. The second fuel gas flow field 42 of the first power generation unit 12a and the second fuel gas flow field 42(rev.) of the second power generation unit 12b are in different phases (reverse phases) from each other, and have the same wave pitch and amplitude. The straight flow grooves 42bs of the second fuel gas flow field 42 (see FIG. 2) and the straight flow grooves 42bs of the second fuel gas flow field 42(rev.) (see FIG. 10) are overlapped in alignment with each other in the stacking direction. The straight flow grooves 42bs extend to a position where the straight flow grooves 42bs face the first resin frame member 58 and the second resin frame member 60 in the stacking direction.

The coolant flow field 32 extending in the direction indicated by the arrow B is formed between the surface 20b of the third metal separator 20 of the first power generation unit 12a and a surface 90b of the first metal separator 90 of the second power generation unit 12b.

Operation of this fuel cell stack 10 will be described below. Detailed description of the first power generation unit 12a will be given, and description of the second power generation unit 12b is omitted.

Firstly, as shown in FIG. 2, an oxygen-containing gas is supplied to the oxygen-containing gas supply passage 22a, and a fuel gas such as a hydrogen-containing gas is supplied to the fuel gas supply passage 24a. Further, a coolant such as pure water, ethylene glycol, or oil is supplied to the pair of the coolant supply passages 25a.

Thus, the oxygen-containing gas from the oxygen-containing gas supply passage 22a flows through the inlet buffer 62a, and the oxygen-containing gas is supplied to the first oxygen-containing gas flow field 26 of the first metal separator 14. Some of the oxygen-containing gas from the oxygen-containing gas supply passage 22a flows through the inlet buffer 74a, and the oxygen-containing gas flows into the second oxygen-containing gas flow field 38 of the second metal separator 18.

As shown in FIGS. 2 and 4, the oxygen-containing gas flows along the first oxygen-containing gas flow field 26 in the horizontal direction indicated by the arrow B, and the oxygen-containing gas is supplied to the cathode 54 of the first membrane electrode assembly 16a. As shown in FIGS. 2 and 7, the remaining oxygen-containing gas flows along the second oxygen-containing gas flow field 38 in the direction indicated by the arrow B, and the oxygen-containing gas is supplied to the cathode 54 of the second membrane electrode assembly 16b.

In the meanwhile, as shown in FIG. 2, the fuel gas from the fuel gas supply passage 24a flows through the supply connection channels 36a of the second metal separator 18, and the fuel gas is supplied to the inlet buffer 68a (see FIG. 8). The fuel gas flows through the inlet buffer 68a, and the fuel gas is supplied to the first fuel gas flow field 34 of the second metal separator 18 (see FIG. 6).

Some of the fuel gas from the fuel gas supply passage 24a flows through the supply connection channels 44a of the third metal separator 20, and the fuel gas is supplied to the inlet buffer 80a (see FIG. 9). The fuel gas flows through the inlet buffer 80a, and the fuel gas is supplied to the second fuel gas flow field 42 of the third metal separator 20 (see FIG. 2).

As shown in FIGS. 2 and 6, the fuel gas moves along the first fuel gas flow field 34 in the direction indicated by the arrow B, and the fuel gas is supplied to the anode 56 of the first membrane electrode assembly 16a. The remaining fuel gas flows along the second fuel gas flow field 42 in the direction indicated by the arrow B, and the fuel gas is supplied to the anode 56 of the second membrane electrode assembly 16b.

Thus, in each of the first membrane electrode assembly 16a and the second membrane electrode assembly 16b, the oxygen-containing gas supplied to each cathode 54 and the fuel gas supplied to each anode 56 are partially consumed in the electrochemical reactions at electrode catalyst layers of the cathode 54 and the anode 56 for generating electricity.

Then, the oxygen-containing gas supplied to, and partially consumed at the cathodes 54 of the first membrane electrode assembly 16a and the second membrane electrode assembly 16b is discharged from the outlet buffers 62b, 74b to the oxygen-containing gas discharge passage 22b.

The fuel gas supplied to, and partially consumed at the anodes 56 of the first membrane electrode assembly 16a and the second membrane electrode assembly 16b flows into the outlet buffers 68b, 80b. The fuel gas flows through the discharge connection channels 36b, 44b, and the fuel gas is discharged to the fuel gas discharge passage 24b.

In the meanwhile, as shown in FIG. 2, the coolant supplied to the pair of coolant supply passages 25a flows into the coolant flow field 32. The coolant is supplied from each coolant supply passage 25a to the coolant flow field 32. After the coolant temporarily flows inward in the direction indicated by the arrow C, the coolant moves in the direction indicated by the arrow B to cool the first membrane electrode assembly 16a and the second membrane electrode assembly 16b. After the coolant flows outward in the direction indicated by the arrow C, the coolant is discharged to the pair of coolant discharge passages 25b.

Further, in the second power generation unit 12b, as in the case of the first power generation unit 12a, power generation is performed by the first and second membrane electrode assemblies 16a, 16b.

In the first embodiment, the first oxygen-containing gas flow field 26 of the first power generation unit 12a shown in FIG. 4, and the first oxygen-containing gas flow field 26(rev.) of the second power generation unit 12b shown in FIG. 11 are in different phases (reverse phases) from each other.

Further, at each of both ends of the wavy flow grooves 26b of the first oxygen-containing gas flow field 26, the straight flow groove 26bs extends straight in the wavelength direction from the central portion in the width of the amplitude of the waveform (see FIG. 4). At each of both ends of the wavy flow grooves 26b of the first oxygen-containing gas flow field 26(rev.), the straight flow groove 26bs extends straight in the wavelength direction from the central portion in the width of the amplitude of the waveform (see FIG. 11).

Figure 14:
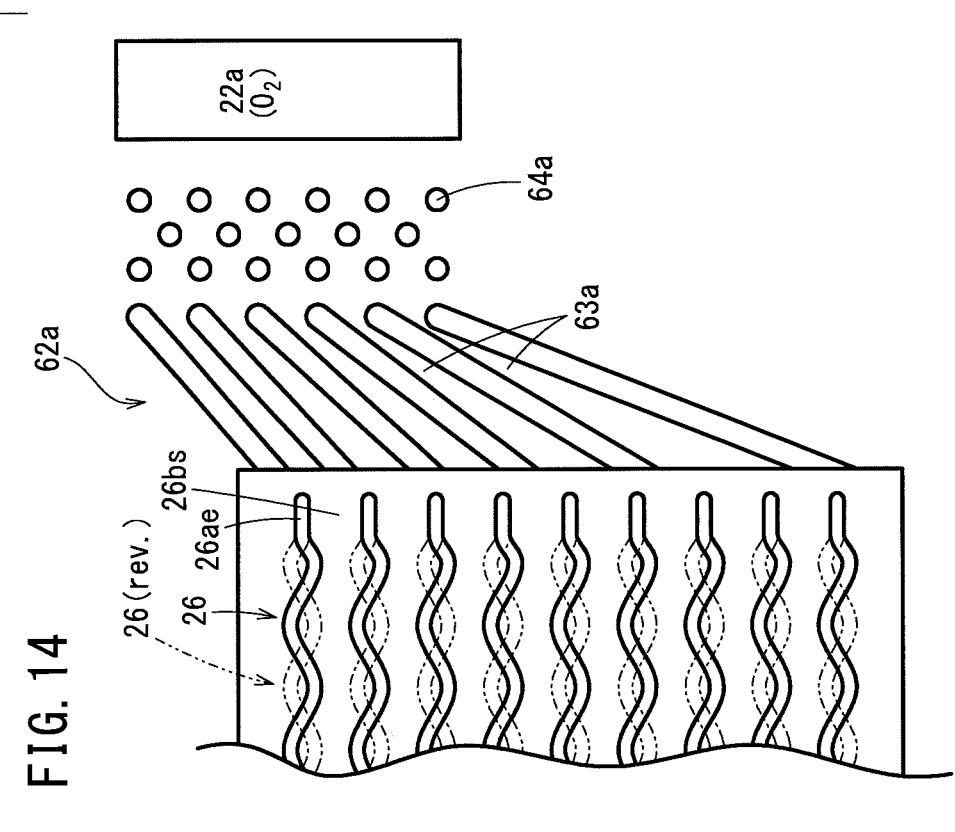
FIG. 14 is view showing first oxygen-containing gas flow fields having different phases.

Therefore, as shown in FIG. 14, even if the first oxygen-containing gas flow fields 26, 26(rev.) are in different phases from each other, the straight flow grooves 26bs at the inlet end of the first oxygen-containing gas flow field 26 and the straight flow grooves 26bs at the inlet end of the first oxygen-containing gas flow field 26(rev.) are overlapped with each other in the stacking direction. Thus, each of the straight flow grooves 26bs are terminated at the same position at the inlet buffer 62a of the first resin frame member 58. In the structure, it is possible to suitably supply the oxygen-containing gas to the first oxygen-containing gas flow fields 26, 26(rev.) through the inlet buffers 62a from the oxygen-containing gas supply passage 22a under the same condition.

In the structure, in the first oxygen-containing gas flow field 26 of the first power generation unit 12a and the first oxygen-containing gas flow field 26(rev.) of the second power generation unit 12b, it becomes possible to suppress variation in the flow distribution of the oxygen-containing gas and the pressure loss as much as possible.

Further, in the second oxygen-containing gas flow field 38 of the first power generation unit 12a and the second oxygen-containing gas flow field 38(rev.) of the second power generation unit 12b, the same advantages as in the case of the first oxygen-containing gas flow fields 26, 26(rev.) are obtained.

Further, the first fuel gas flow field 34 of the first power generation unit 12a shown in FIG. 6 and the first fuel gas flow field 34(rev.) of the second power generation unit 12b shown in FIG. 12 are in different phases (reverse phases) from each other.

At each of both ends of the wavy flow grooves 34b of the first fuel gas flow field 34, the straight flow groove 34bs extends straight in the wavelength direction from the central portion of the width of the amplitude of the waveform (see FIG. 6). Further, at each of both ends of the wavy flow grooves 34b of the first fuel gas flow field 34(rev.), the straight flow groove 34bs extends straight in the wavelength direction from the central portion in the width of the amplitude of the waveform (see FIG. 12).

Therefore, even if the first fuel gas flow fields 34, 34(rev.) are in different phases from each other, the straight flow grooves 34bs as the inlet end of the first fuel gas flow field 34 and the straight flow grooves 34bs as the inlet end of the first fuel gas flow field 34(rev.) are overlapped with each other in the stacking direction. Thus, the straight flow grooves 34bs are terminated at the same position at the inlet buffer 68a of the first resin frame member 58. Thus, it is possible to suitably supply the fuel gas from the fuel gas supply passage 24a to the first fuel gas flow fields 34, 34(rev.) through the inlet buffers 68a under the same condition.

In the structure, in the first fuel gas flow field 34 of the first power generation unit 12a and the first fuel gas flow field 34(rev.) of the second power generation unit 12b, it becomes possible to suppress variation in the flow distribution of the fuel gas and the pressure loss as much as possible.

Further, in the second fuel gas flow field 42 of the first power generation unit 12a and the second fuel gas flow field 42(rev.) of the second power generation unit 12b, the same advantages as in the case of the first fuel gas flow fields 34, 34(rev.) are obtained.

Figure 29:
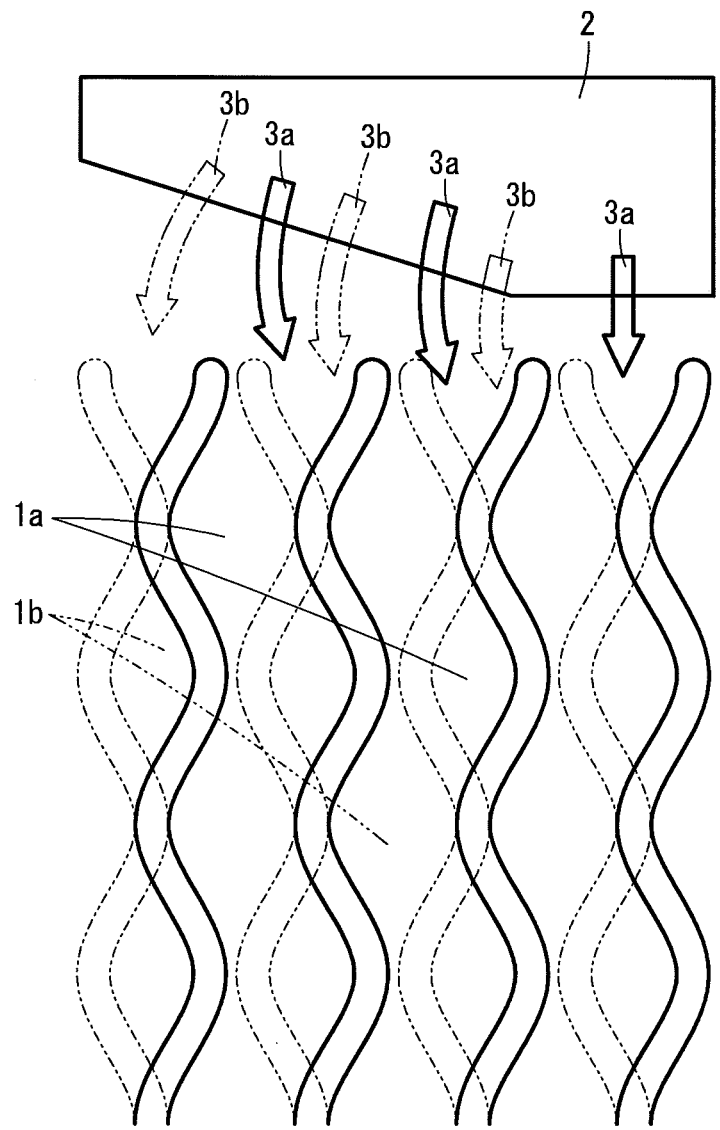
FIG. 29 is a view showing a general case where a first fuel gas flow field and a second fuel gas flow field having reverse phases with respect to each other.

Further, in the first embodiment, in the first power generation unit 12*a* and the second power generation unit 12*b* having different phases of the wavy flow fields, the same component can be used for both of the first resin frame member 58 and the second resin frame member 60. In the case of the first fuel gas flow field 1*a* and the second fuel gas flow field 1*b* shown in FIG. 29 having different end positions, two types of resin frame members corresponding to the respective end positions are required.

In contrast, in the first embodiment, even if the phases of the wavy flow fields are different, the ends of the wavy flow fields are terminated at the same position. Therefore, it is not required to prepare dedicated resin frame members for the first power generation unit 12*a* and the second power generation unit 12*b*, respectively. Accordingly, the fuel cell stack 10 has economical structure as a whole, and the number of components of the fuel cell stack 10 is reduced suitably.

Figure 15:
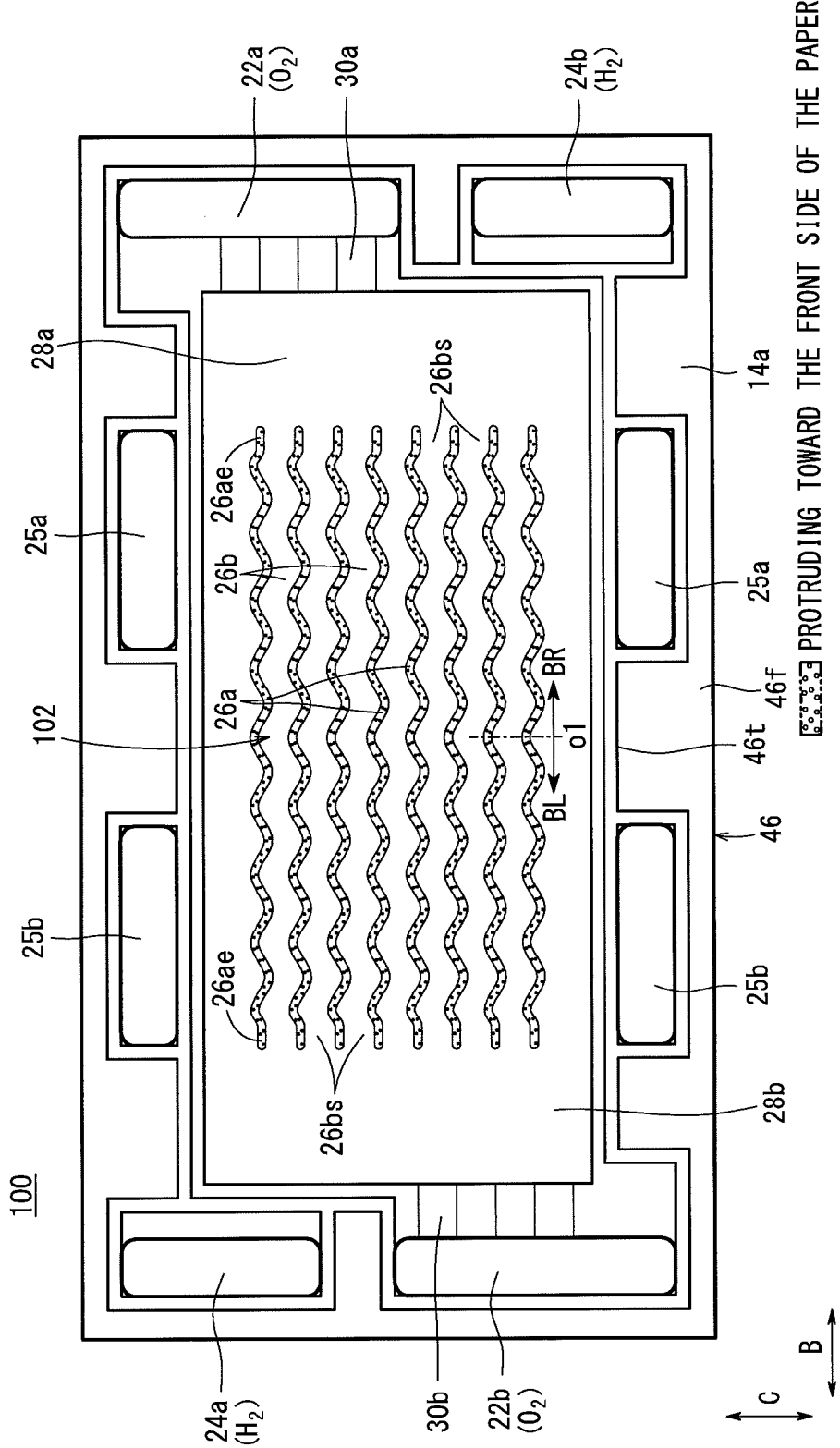
FIG. 15 is a front view showing a first metal separator of a fuel cell stack according to a second embodiment of the present invention.

FIG. 15 is a front view showing a first metal separator 100 of a fuel cell stack according to a second embodiment of the present invention. The constituent elements that are identical to those of the first metal separator 14 of the fuel cell stack 10 according to the first embodiment are labeled with the same reference numerals and detailed description thereof will be omitted. Further, also in third and other embodiments described later, the constituent elements that are identical to those of the first metal separator 14 of the fuel cell stack 10 according to the first embodiment are labeled with the same reference numerals and detailed description thereof will be omitted.

In the second embodiment, though only a first oxygen-containing gas flow field 102 (corresponding to the first oxygen-containing gas flow field 26 of the first embodiment) of the first metal separator 100 will be described, other flow fields (oxygen-containing gas flow field, fuel gas flow field, and coolant flow field) have the same structure. Also in the third and other embodiments, the oxygen-containing gas flow field and the other flow fields have the same structure.

The first oxygen-containing gas flow field 102 has a laterally symmetrical shape. In the wavy protrusion 26*a*, four lower ridges are provided from the center o1 of the upper ridge toward the right side (in a direction indicated by an arrow BR), and four lower ridges are provided from the center o1 of the upper ridge toward the left side (in a direction indicated by an arrow BL).

In the second embodiment, flow fields including the first oxygen-containing gas flow field 102 has a laterally symmetrical shape. In the structure, as shown in FIG. 1, by rotating the first power generation unit 12*a* by 180° (upside down), the first power generation unit 12*a* can be also used as the second power generation unit 12*b*. Therefore, the overall structure of the fuel cell stack is simplified economically.

Figure 16:
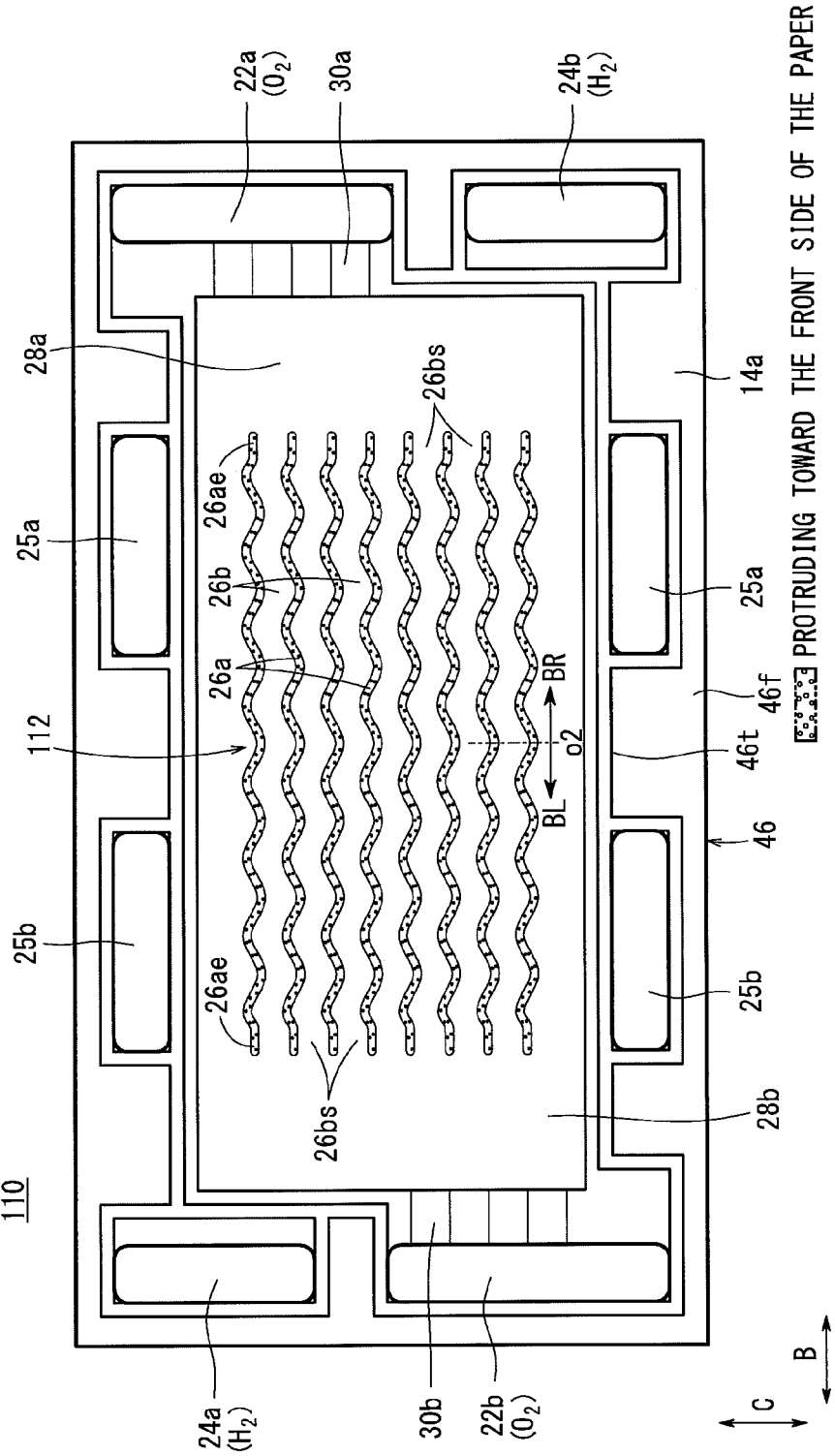
FIG. 16 is a front view showing a first metal separator of a fuel cell stack according to a third embodiment of the present invention.

FIG. 16 is a front view showing a first metal separator 110 of a fuel cell stack according to a third embodiment of the present invention. A first oxygen-containing gas flow field 112 is provided in the first metal separator 110.

The first oxygen-containing gas flow field 112 has a laterally symmetrical shape. In the wavy protrusion 26*a*, three lower ridges are provided from the center o2 of the lower ridge toward the right side (in a direction indicated by an arrow BR), and three lower ridges are provided from the center o2 of the lower ridge toward the left side (in a direction indicated by an arrow BL).

As described above, the third embodiment has the same structure as the second embodiment, and the same advantages as in the case of the second embodiment are obtained.

Figure 17:
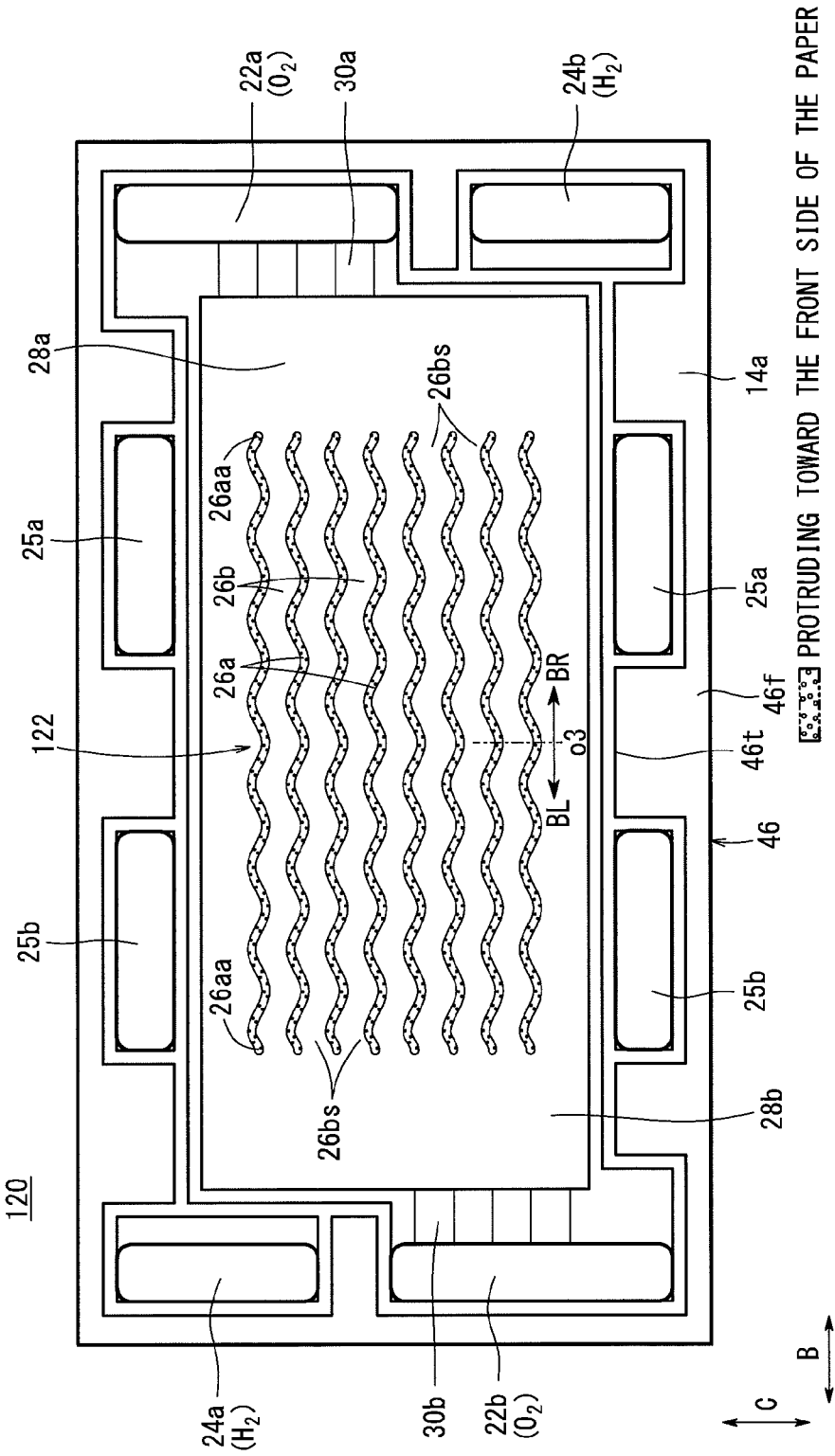
FIG. 17 is a front view showing a first metal separator of a fuel cell stack according to a fourth embodiment of the present invention.

FIG. 17 is a front view showing a first metal separator 120 of a fuel cell stack according to a fourth embodiment of the present invention. A first oxygen-containing gas flow field 122 is provided in the first metal separator 120.

The first oxygen-containing gas flow field 122 has a laterally symmetrical shape. In the wavy protrusion 26*a*, three lower ridges are provided from the center o3 of the lower ridge toward the right side (in a direction indicated by an arrow BR), and three lower ridges are provided from the center o3 of the lower ridge toward the left side (in a direction indicated by an arrow BL). Ends 26*aa* of the wavy protrusions 26*a* are terminated at the central portion of the width of the amplitude of the waveform, and no straight protrusions 26*ae* are provided.

In the fourth embodiment having the above structure, the same advantages as in the cases of the first to third embodiments are obtained.

Figure 18:
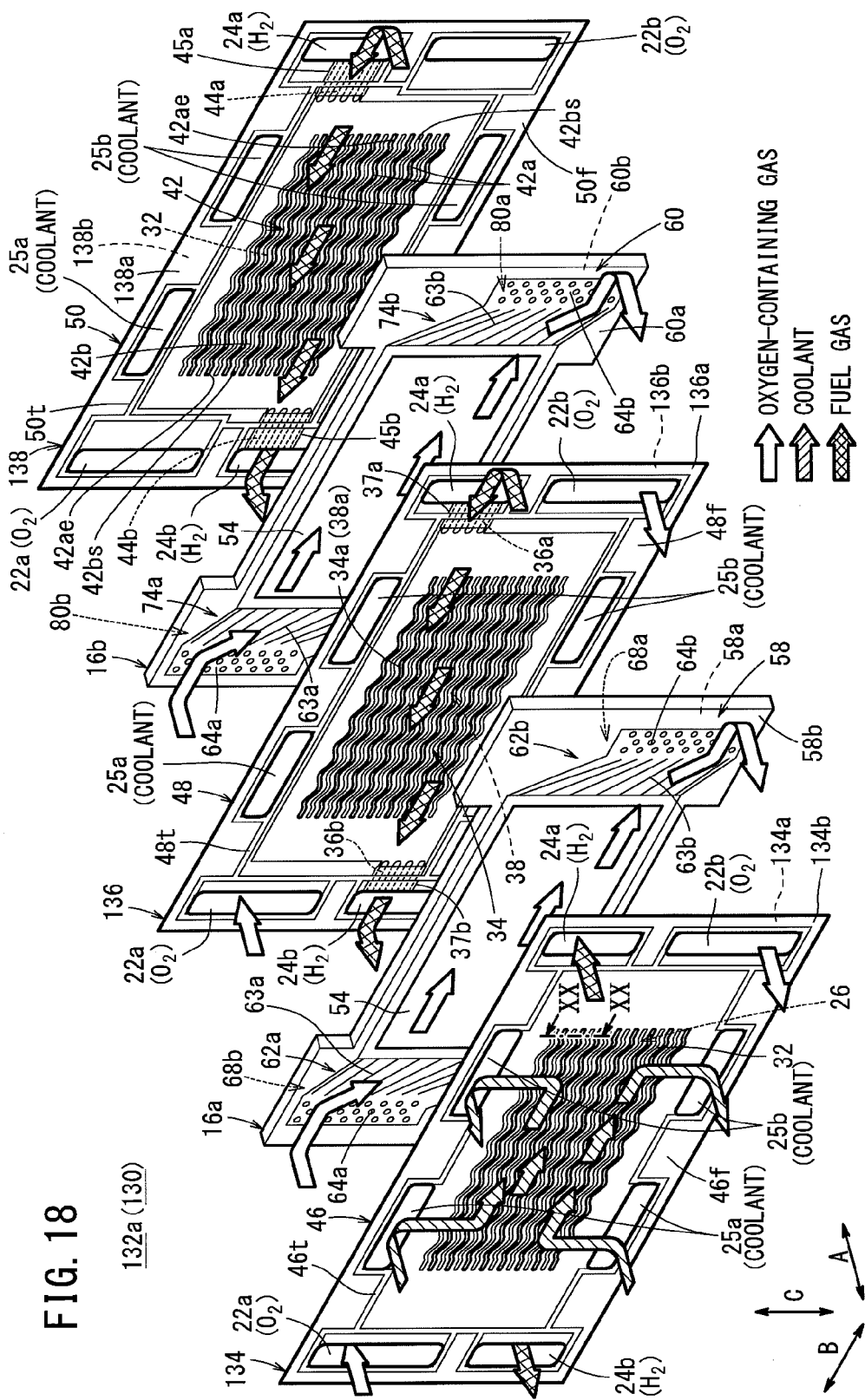
FIG. 18 is an exploded perspective view showing main components of a first power generation unit of a fuel cell stack according to a fifth embodiment of the present invention.
Figure 19:
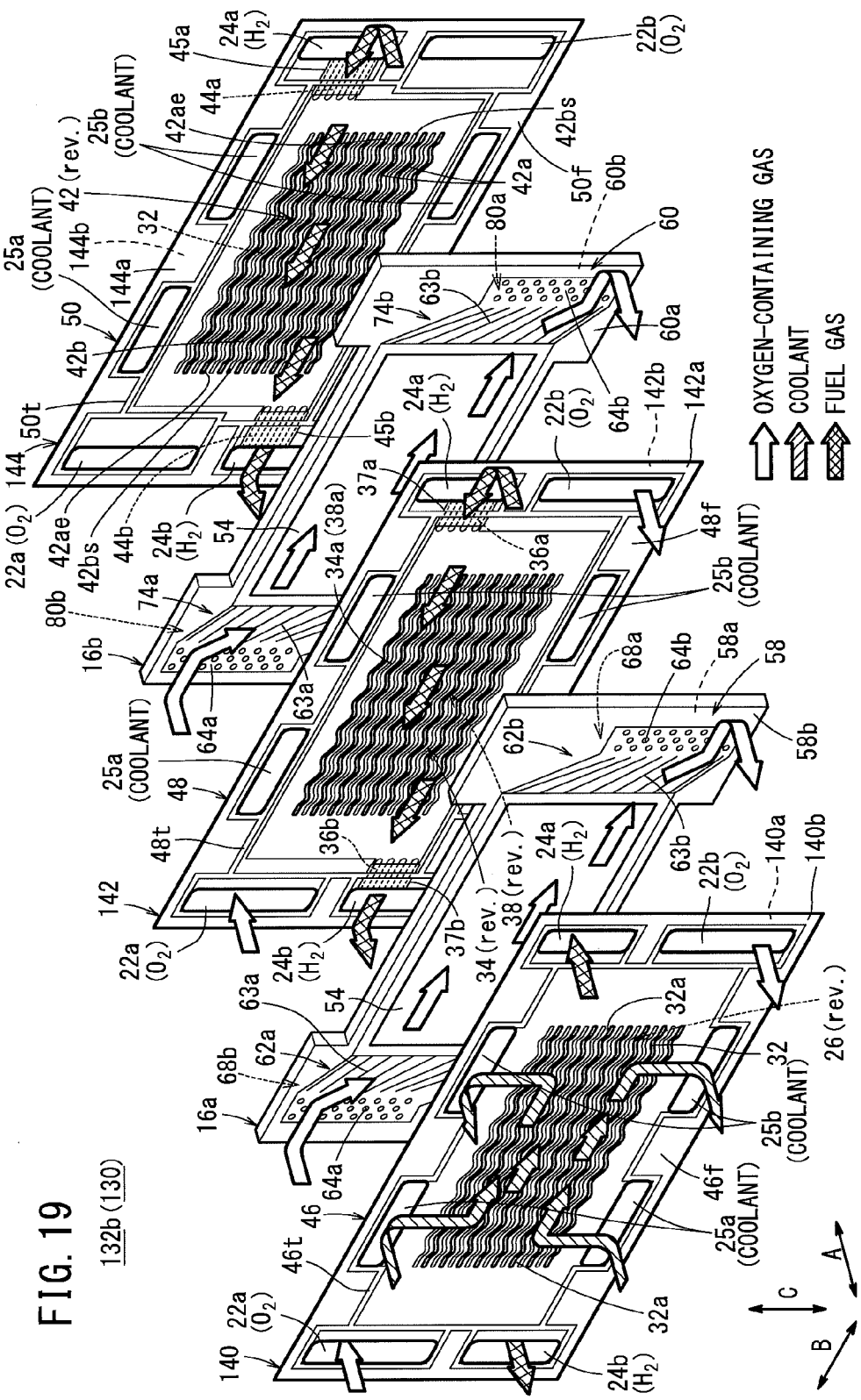
FIG. 19 is an exploded perspective view showing main components of a second power generation unit of the fuel cell stack.

FIG. 18 is an exploded perspective view showing main components of a first power generation unit 132*a* of a fuel cell stack 130 according to a fifth embodiment of the present invention. FIG. 19 is an exploded perspective view showing main components of a second power generation unit 132*b* of the fuel cell stack 130. The constituent elements of the fuel cell stack 130 that are identical to those of the fuel cell stack 10 according to the first embodiment are labeled with the same reference numerals and detailed description thereof will be omitted.

Figure 20:
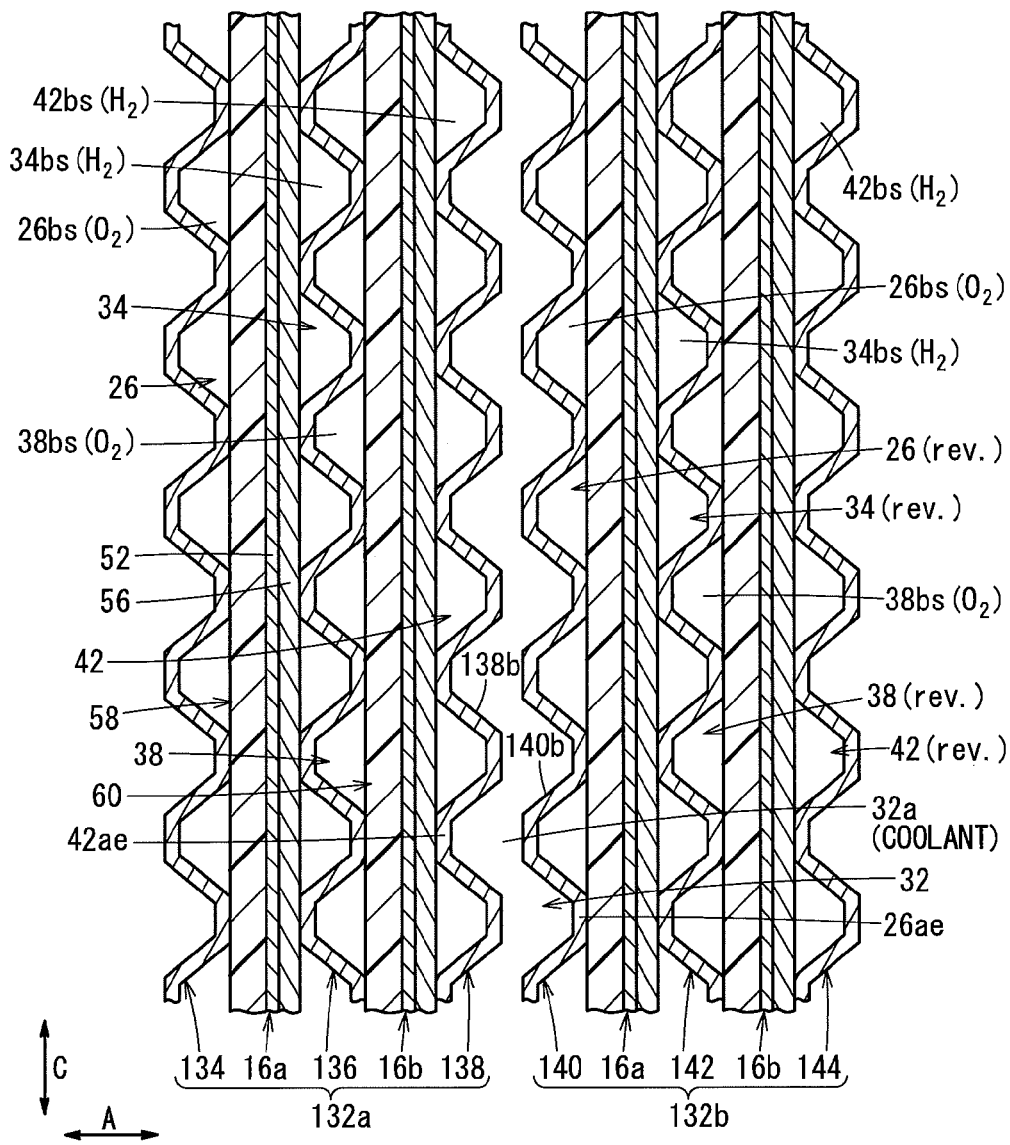
FIG. 20 is a cross sectional view showing the fuel cell stack, taken along a line XX-XX in FIG. 18.
Figure 21:
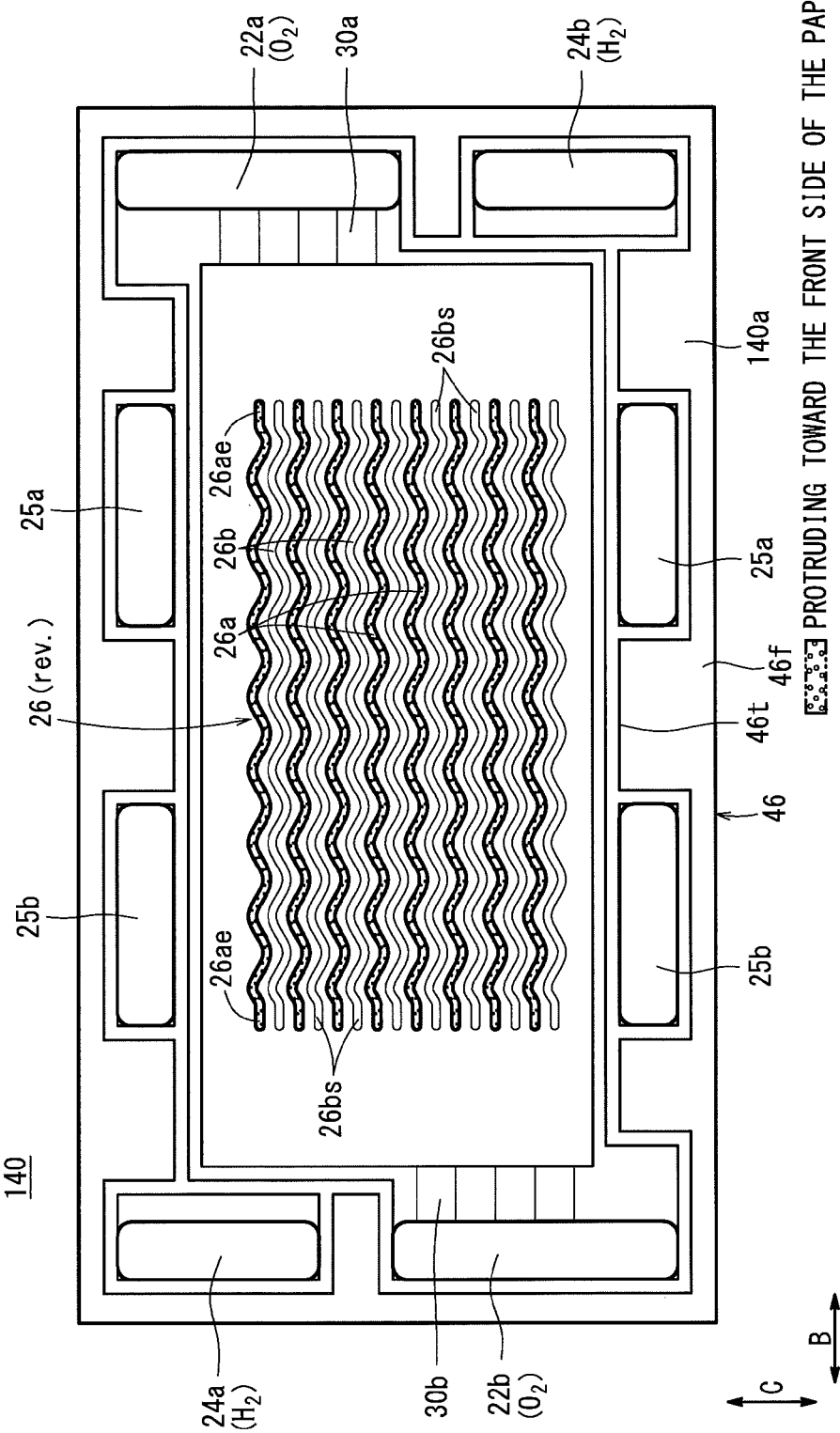
FIG. 21 is a front view showing a first metal separator of a second power generation unit of the fuel cell stack.

As shown in FIGS. 18 and 20, the first power generation unit 132*a* includes a first metal separator 134, a first membrane electrode assembly 16*a*, a second metal separator 136, a second membrane electrode assembly 16*b*, and a third metal separator 138. As shown in FIGS. 19 and 20, the second power generation unit 132*b* includes a first metal separator 140, a first membrane electrode assembly 16*a*, a second metal separator 142, a second membrane electrode assembly 16*b*, and a third metal separator 144.

As shown in FIG. 20, a coolant flow field 32 is formed between a surface 138*b* of the third metal separator 138 of the first power generation unit 132*a* and a surface 140*b* of the first metal separator 140 of the second power generation unit 132*b*. The coolant flow field 32 extends in the direction indicated by the arrow B. As shown in FIG. 19, the coolant flow field 32 includes flow field ends 32*a* as a flow field inlet end and a flow field outlet end.

As shown in FIG. 20, straight protrusions 42*ae* of a second fuel gas flow field 42 of the third metal separator 138 and straight flow grooves 26*bs* of a first oxygen-containing gas flow field 26(rev.) of the first metal separator 140 are positioned in alignment with, and face each other in the stacking direction. Straight flow grooves 42*bs* of the second fuel gas flow field 42 and straight protrusions 26*ae* of a first oxygen-containing gas flow field 26(rev.) are positioned in alignment with, and face each other in the stacking direction.

A gap is present between the third metal separator 138 and the first metal separator 140, corresponding to the flow field end of the second fuel gas flow field 42 and a flow field end of the first oxygen-containing gas flow field 26(rev.). The third metal separator 138 and the first metal separator 140 are spaced from each other by the gap. This gap forms a flow field end 32*a* of the coolant flow field 32.

In the fifth embodiment, as shown in FIGS. 18 to 21, the second fuel gas flow field 42 of the first power generation unit 132*a* and the first oxygen-containing gas flow field 26(rev.) of the second power generation unit 132*b* are in different phases (reverse phases) from each other. In this regard, the straight protrusions 42*ae* of the second fuel gas flow field 42 and the straight flow grooves 26*bs* of the first oxygen-containing gas flow field 26(rev.) are positioned in alignment with, and face each other in the stacking direction.

In the structure, a gap is present between the third metal separator 138 and the first metal separator 140, corresponding to the flow field end of the second fuel gas flow field 42 and a flow field end of the first oxygen-containing gas flow field 26(rev.). The third metal separator 138 and the first metal separator 140 are spaced from each other by the gap. This gap forms a flow field end 32a of the coolant flow field 32.

Therefore, for example, when a load in the stacking direction is applied to the fuel cell stack 130, the gap between the third metal separator 138 and the first metal separator 140 is contracted to reduce the load, and it is possible to reliably suppress generation of the excessive surface pressure. In particular, when variation occurs in the thickness of the first resin frame member 58 and the thickness of the second resin frame member 60, it becomes possible to reliably absorb the variation by the gap between the third metal separator 138 and the first metal separator 140.

Thus, with the simple structure, it becomes possible to suppress a large load from being applied locally to the first power generation unit 132a and the second power generation unit 132b, and improve the power generation performance suitably.

Figure 22:
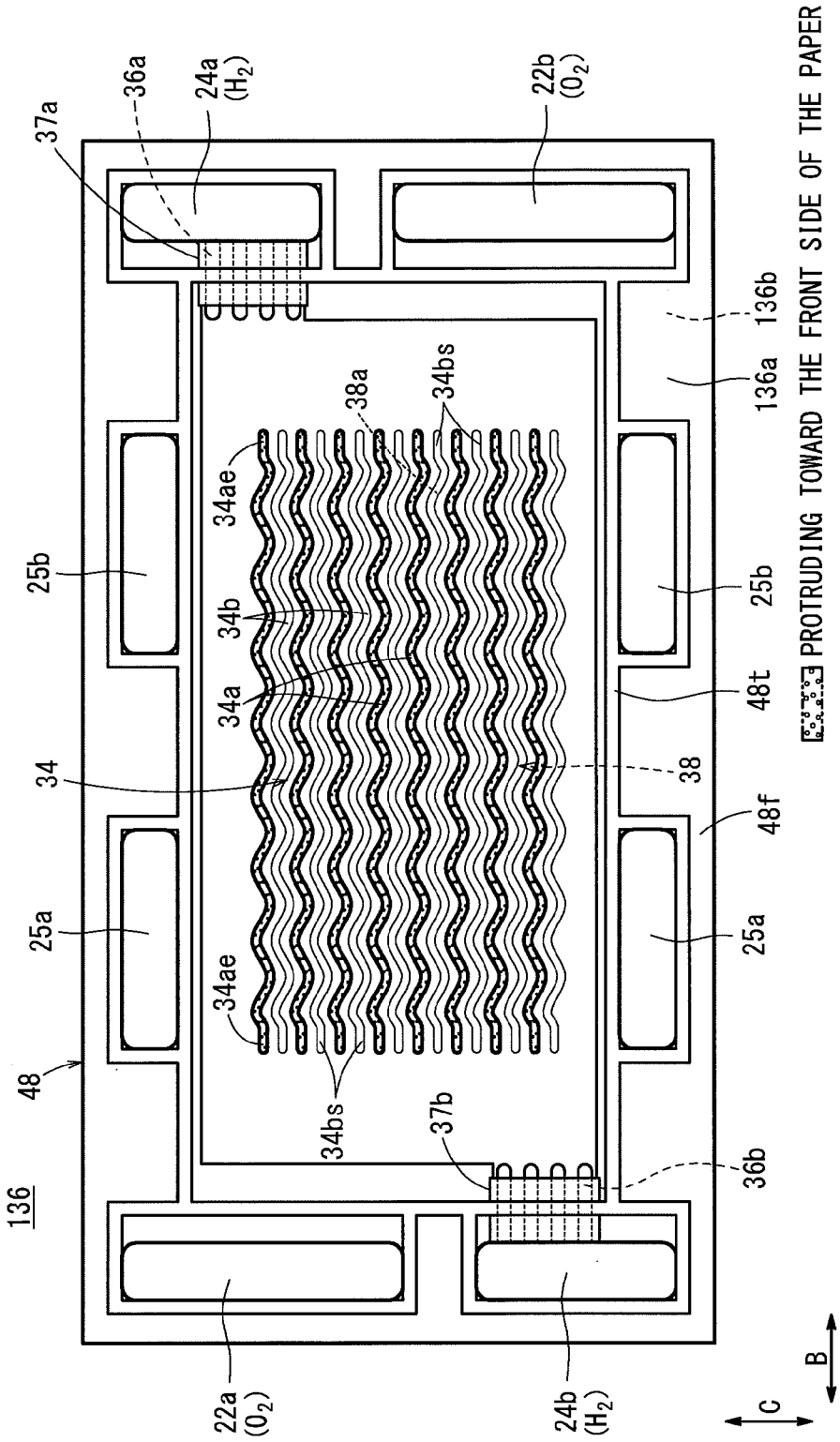
FIG. 22 is a front view showing a second metal separator of the first power generation unit.
Figure 23:
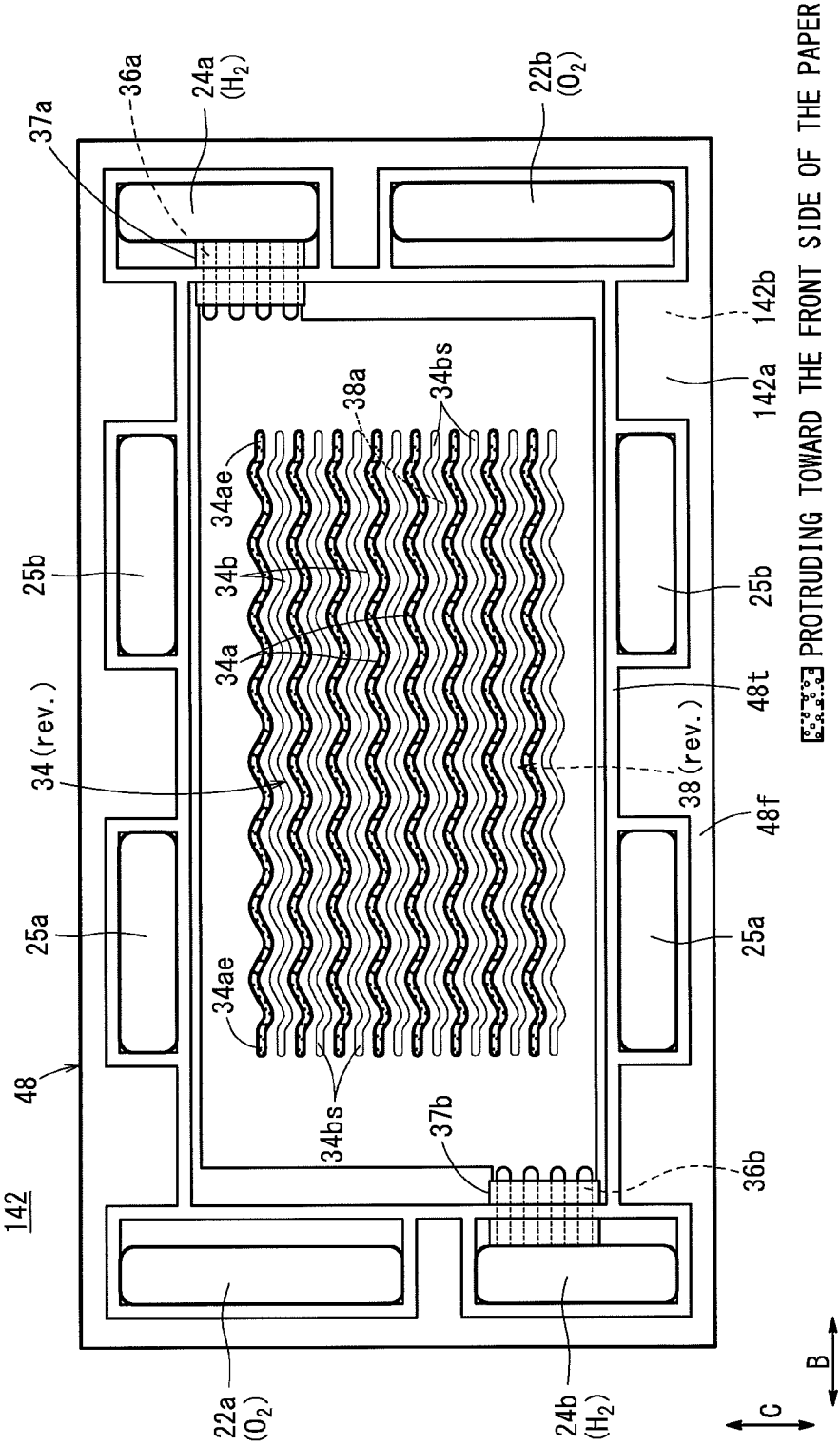
FIG. 23 is a front view showing a second metal separator of the second power generation unit.

Further, the first fuel gas flow field 34 of the first power generation unit 132a and the first fuel gas flow field 34(rev.) of the second power generation unit 132b are in different phases (reverse phases) from each other. Further, at both ends of a plurality of wavy flow grooves 34b of the first fuel gas flow field 34, straight flow grooves 34bs extend straight in the wavelength direction from the central portion of the width of the amplitude of the waveform (see FIG. 22). Further, at both ends of a plurality of wavy flow grooves 34b of the first fuel gas flow field 34(rev.), straight flow grooves 34bs extend straight in the wavelength direction from the central portion of the width of the amplitude of the waveform (see FIG. 23).

Therefore, even the first fuel gas flow fields 34, 34(rev.) are in different phases from each other, the straight flow grooves 34bs as the inlet ends of the first fuel gas flow fields 34, 34(rev.) are overlapped with each other in the stacking direction. Thus, the straight flow grooves 34bs are terminated at the same position at the inlet buffer 68a of the first resin frame member 58. In the structure, the fuel gas can be supplied suitably from the fuel gas supply passage 24a to the first fuel gas flow fields 34, 34(rev.) through the inlet buffers 68a under the same condition.

Accordingly, in the first fuel gas flow field 34 of the first power generation unit 132a and the first fuel gas flow field 34(rev.) of the second power generation unit 132b, it becomes possible to suppress variation in the flow distribution of the fuel gas and the pressure loss as much as possible.

Further, the second fuel gas flow fields 42, 42(rev.), the first oxygen-containing gas flow fields 26, 26(rev.), and the second oxygen-containing gas flow fields 38, 38(rev.) have the same relationship as the first fuel gas flow fields 34, 34(rev.). Therefore, the same advantages as in the case of the first fuel gas flow fields 34, 34(rev.) are obtained.

Figure 24:
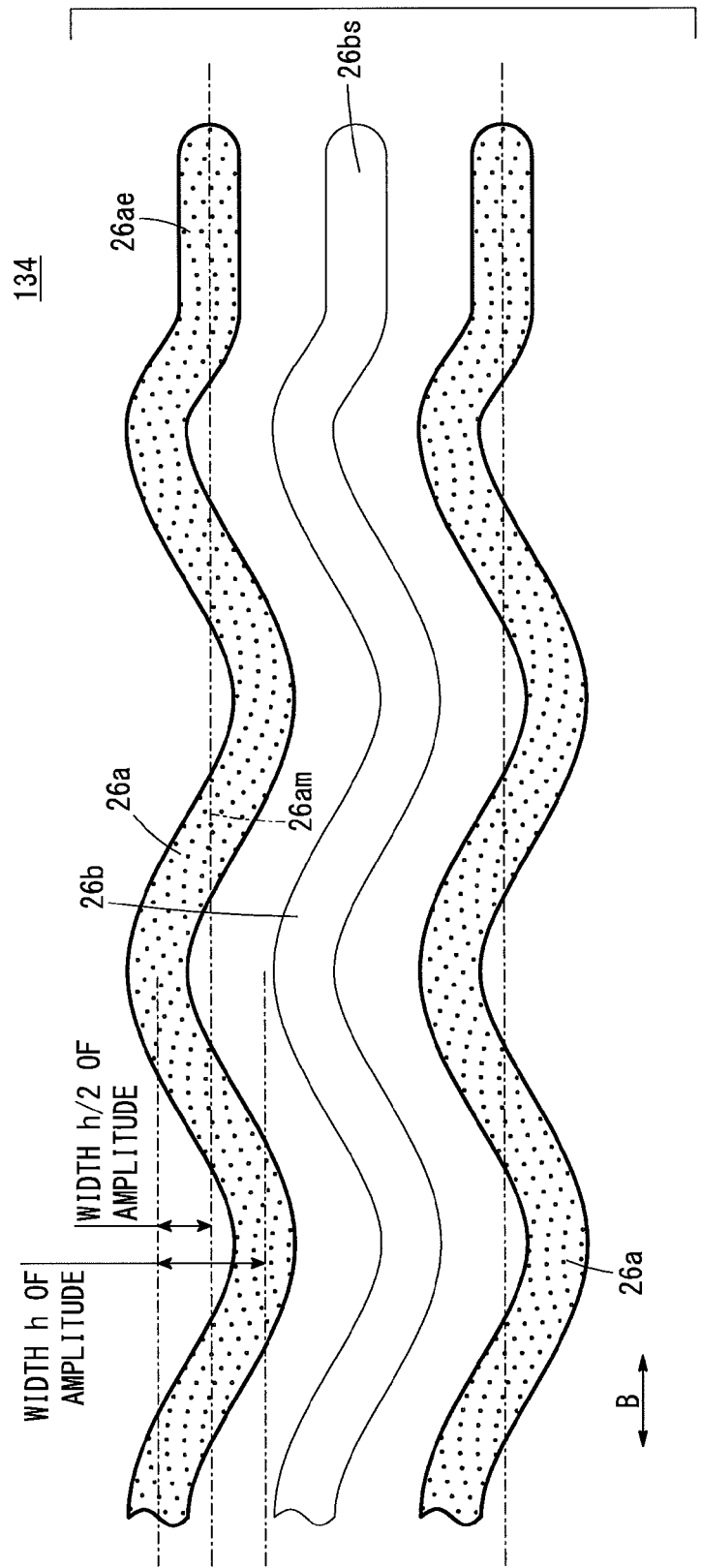
FIG. 24 is an enlarged view showing a main part of a first metal separator of the first power generation unit.

In the fifth embodiment, for example, as shown in FIG. 24, at an end of each wavy protrusion 26a of the first oxygen-containing gas flow field 26, a straight protrusion 26ae extending straight in the wavelength direction indicated by the arrow B along the central portion 26am is provided. However, the present invention is not limited in this respect. Any shape can be adopted as long as the flow field inlet end or the flow field outlet end of the fuel gas flow field having the back surface forming the coolant flow field and the flow field inlet end or the flow field outlet end of the oxygen-containing gas flow field having the back surface forming the coolant flow field are positioned in alignment with each other as viewed in the stacking direction.

Figure 25:
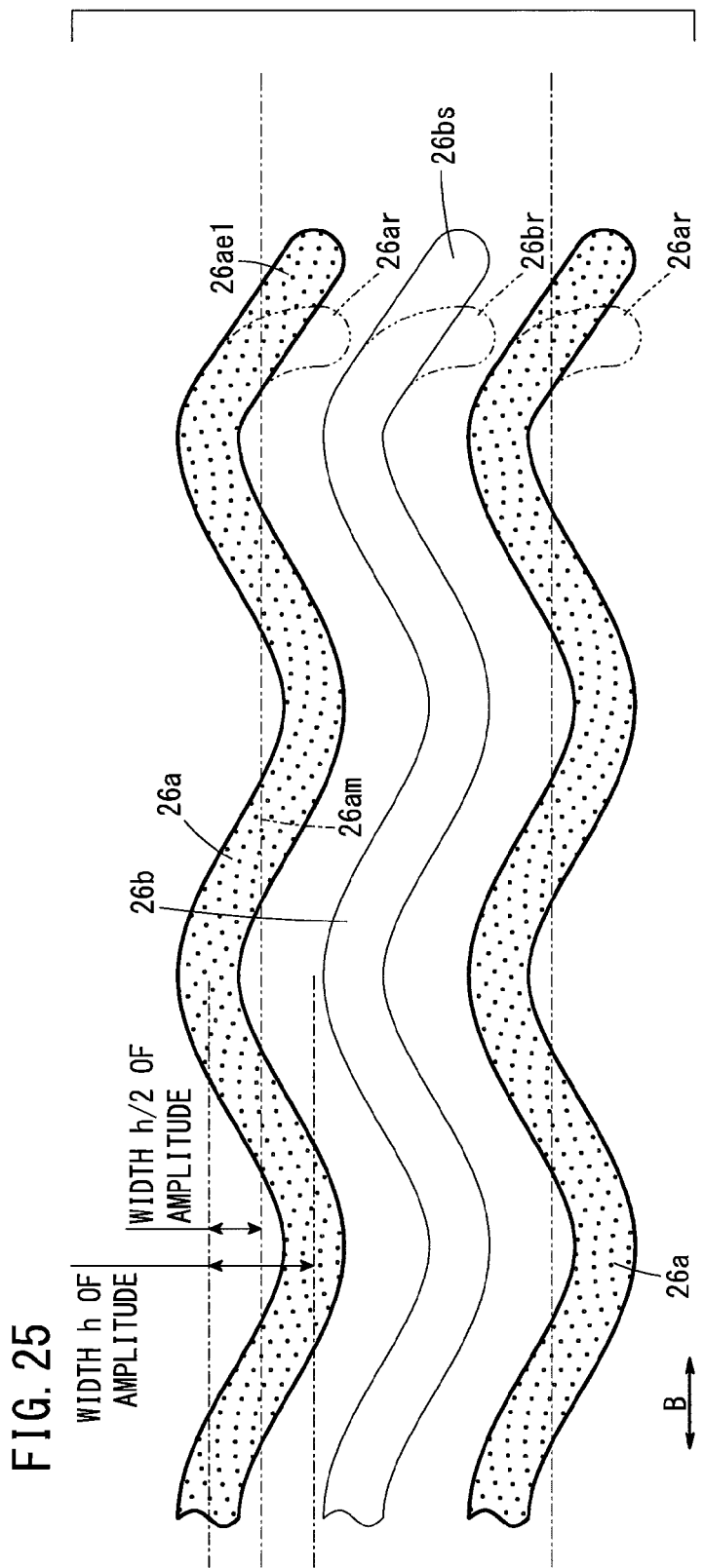
FIG. 25 is a view showing different end shapes of a first oxygen-containing gas flow field.

As shown in FIG. 25, the straight protrusions 26ae1 extending in a direction inclined downward (or upward) from the wavelength direction indicated by the arrow B may be provided. In the structure, the straight flow grooves 26bs are inclined as well. Alternatively, curved protrusions 26ar and curved flow grooves 26br may be provided as well.

Figure 26:
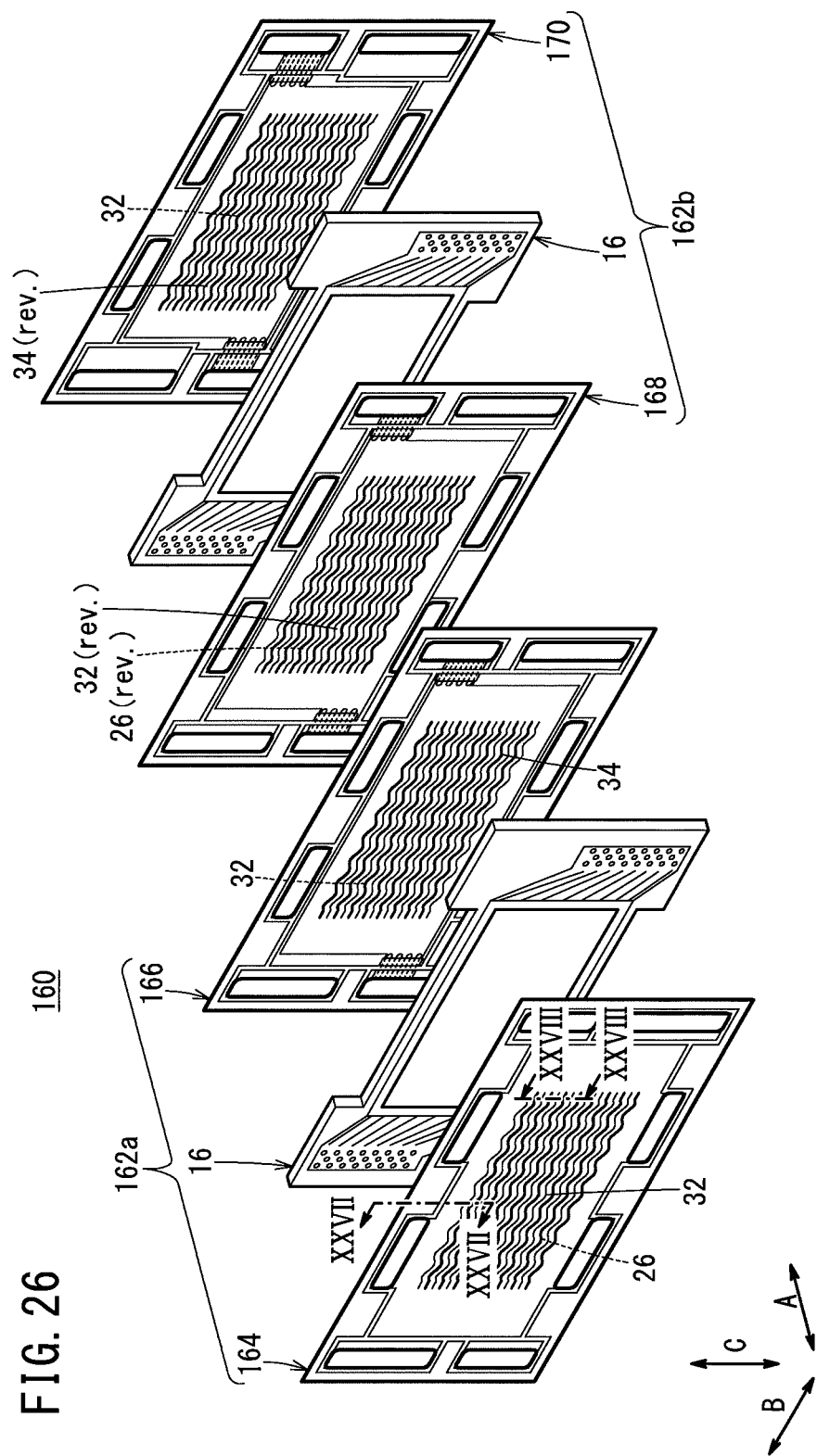
FIG. 26 is an exploded perspective view showing main components of a fuel cell stack according to a sixth embodiment of the present invention.

FIG. 26 is an exploded perspective view showing main components of a fuel cell stack 160 according to a sixth embodiment of the present invention. The constituent elements that are identical to those of the fuel cell stack 10 according to the first embodiment are labeled with the same reference numerals and detailed description thereof will be omitted.

Figure 27:
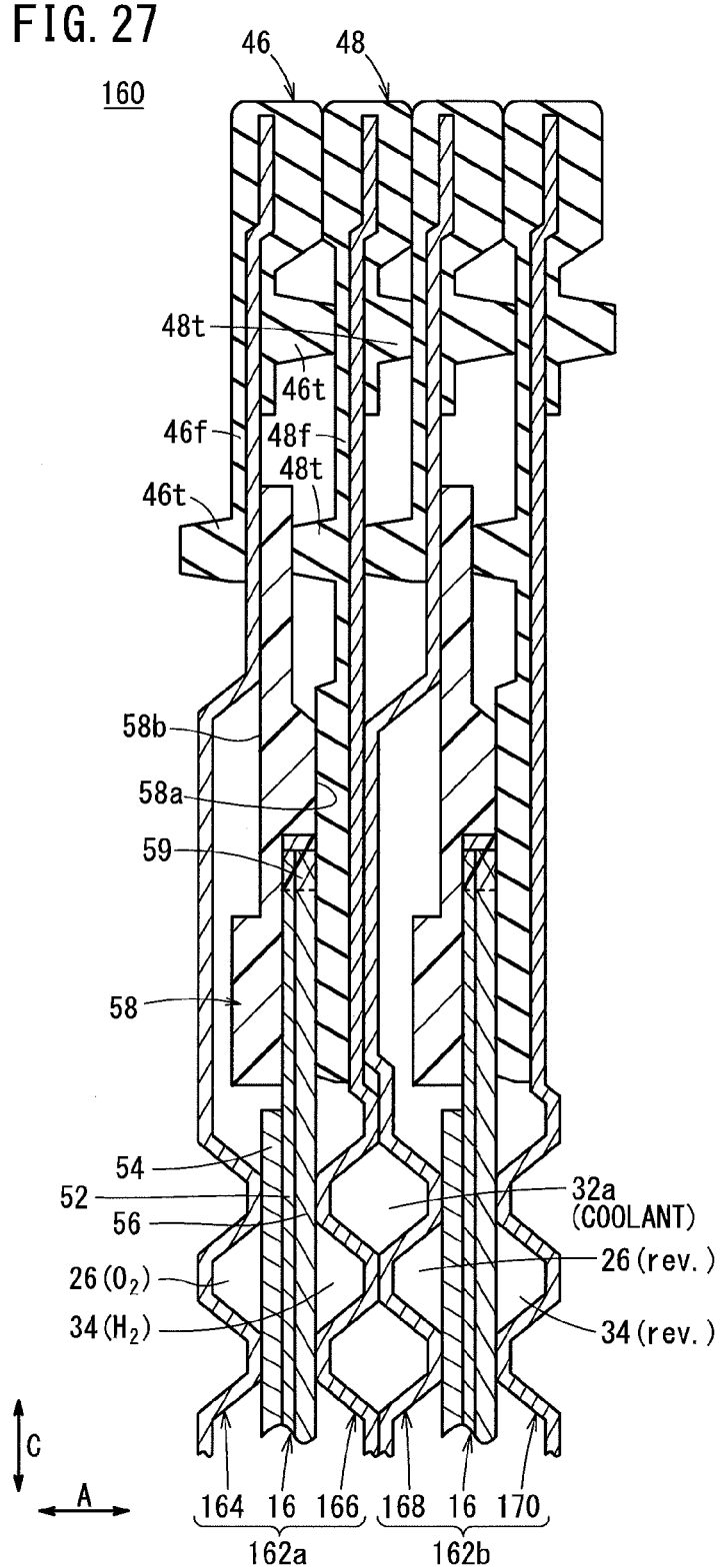
FIG. 27 is a cross sectional view showing the fuel cell stack, taken along a line XXVII-XXVII in FIG. 26.
Figure 28:
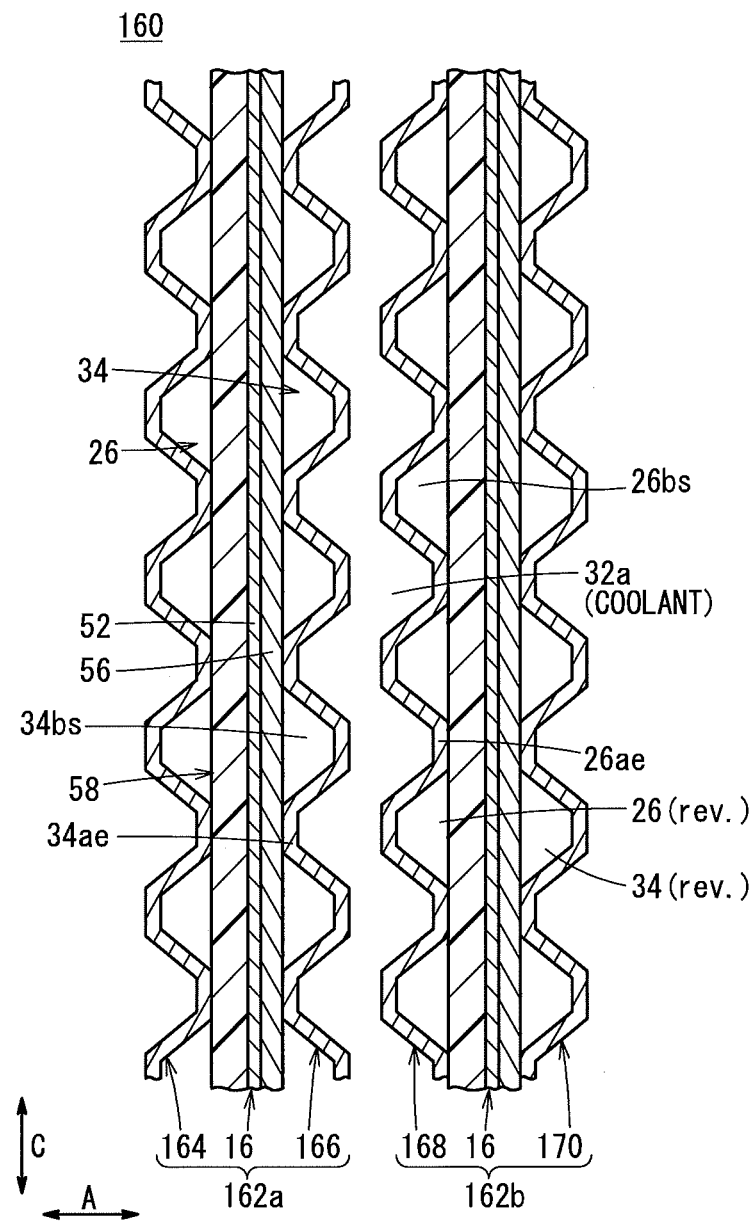
FIG. 28 is a cross sectional view showing the fuel cell stack, taken along a line XXVIII-XXVIII in FIG. 26.

As shown in FIGS. 26 to 28, the fuel cell stack 160 is formed by stacking first power generation units 162a and second power generation units 162b alternately in a horizontal direction indicated by the arrow A.

The first power generation unit 162a includes a first metal separator 164, a membrane electrode assembly (MEA) 16, and a second metal separator 166. An oxygen-containing gas flow field 26 and a coolant flow field 32 are provided on both sides of the first metal separator 164. A fuel gas flow field 34 and the coolant flow field 32 are provided on both sides of the second metal separator 166.

The second power generation unit 162b includes a first metal separator 168, a membrane electrode assembly (MEA) 16, and a second metal separator 170. An oxygen-containing gas flow field 26(rev.) and a coolant flow field 32(rev.) are provided on both sides of the first metal separator 168. A fuel gas flow field 34(rev.) and the coolant flow field 32 are provided on both sides of the second metal separator 170.

As shown in FIG. 28, straight protrusions 34ae of the fuel gas flow field 34 of the second metal separator 166 and straight flow grooves 26bs of the oxygen-containing gas flow field 26(rev.) of the first metal separator 168 are positioned in alignment with, and face each other in the stacking direction. Straight flow grooves 34bs of the fuel gas flow field 34 and straight protrusions 26ae of the oxygen-containing gas flow field 26(rev.) are positioned in alignment with, and face each other in the stacking direction.

A gap is present between the second metal separator 166 and the first metal separator 168, corresponding to the flow field end of the fuel gas flow field 34 and the flow field end of the oxygen-containing gas flow field 26(rev.), and the second metal separator 166 and the first metal separator 168 are spaced from each other by the gap. This gap forms the flow field end 32a of the coolant flow field 32.

In the sixth embodiment, with the simple structure, it is possible to suppress a large load from being applied locally to the first power generation unit 162a and the second power generation unit 162b. Thus, the same advantages as in the case of the fifth embodiment are obtained. For example, it becomes possible to improve the power generation performance suitably as in the case of the above-described fifth embodiment.

The invention claimed is:

1. A fuel cell stack comprising a first power generation unit and a second power generation unit, the first power generation unit and the second power generation unit each comprising a membrane electrode assembly and a metal separator being stacked, the membrane electrode assembly including an anode, a cathode, and an electrolyte membrane interposed between the anode and the cathode, a wavy fuel gas flow field including a plurality of flow grooves configured to allow a fuel gas to flow along an electrode surface of the anode in a wavy pattern and a wavy oxygen-containing gas flow field including a plurality of flow grooves configured to allow an oxygen-containing gas to flow along an electrode surface of the cathode in a wavy pattern being formed in each of the first power generation unit and the second power generation unit, wherein, in the first power generation unit, the wavy fuel gas flow field and the wavy oxygen-containing gas flow field are in a same phase on both sides of the membrane electrode assembly;

in the second power generation unit, the wavy fuel gas flow field and the wavy oxygen-containing gas flow field are in a same phase on both sides of the membrane electrode assembly, but the phase is different from the phase of the wavy fuel gas flow field and the wavy oxygen-containing gas flow field of the first power generation unit;

the first power generation unit and the second power generation unit are stacked together to form a coolant flow field between a back surface of the wavy fuel gas flow field and a back surface of the wavy oxygen-containing gas flow field in the different phases from each other, configured to allow a coolant to flow through the coolant flow field; and at least one end of the wavy fuel gas flow field and at least one end of the wavy oxygen-containing gas flow field are terminated at a central portion of a width of amplitude of a waveform.

2. The fuel cell stack according to claim 1, wherein at least one end of the wavy fuel gas flow field and at least one end of the wavy oxygen-containing gas flow field form a straight flow groove extending straight in a wavelength direction from the central portion of the width of the amplitude of the waveform.

3. The fuel cell stack according to claim 1, wherein a fuel gas passage configured to allow the fuel gas to flow in a stacking direction of the first power generation unit and the second power generation unit, and an oxygen-containing gas passage configured to allow the oxygen-containing gas to flow in the stacking direction, and a coolant passage configured to allow the coolant to flow in the stacking direction, are formed;

a resin frame member is formed integrally with an outer end of the membrane electrode assembly; and the resin frame member includes a plurality of linear flow grooves connecting the oxygen-containing gas passage and the wavy oxygen-containing gas flow field and a plurality of linear flow grooves connecting the fuel gas passage and the wavy fuel gas flow field.

4. A fuel cell stack comprising a first power generation unit and a second power generation unit, the first power generation unit and the second power generation unit each comprising a membrane electrode assembly and a metal separator being stacked, the membrane electrode assembly including an anode, a cathode, and an electrolyte membrane interposed between the anode and the cathode, a wavy fuel gas flow field including a plurality of flow grooves configured to allow a fuel gas to flow along an electrode surface of the anode in a wavy pattern and a wavy oxygen-containing gas flow field including a plurality of flow grooves configured to allow an oxygen-containing gas to flow along an electrode surface of the cathode in a wavy pattern being formed in each of the first power generation unit and the second power generation unit, wherein, in the first power generation unit, the wavy fuel gas flow field and the wavy oxygen-containing gas flow field are in a same phase on both sides of the membrane electrode assembly;

in the second power generation unit, the wavy fuel gas flow field and the wavy oxygen-containing gas flow field are in a same phase on both sides of the membrane electrode assembly, but the phase is different from the phase of the wavy fuel gas flow field and the wavy oxygen-containing gas flow field of the first power generation unit;

the first power generation unit and the second power generation unit are stacked together to form a coolant flow field between a back surface of the wavy fuel gas flow field and a back surface of the wavy oxygen-containing gas flow field in the different phases from each other, configured to allow a coolant to flow through the coolant flow field; and a flow field end part of a flow field inlet end or a flow field outlet end of the wavy fuel gas flow field of the first power generation unit including the back surface forming the coolant flow field and a flow field end part of a flow field inlet end or a flow field outlet end of the wavy oxygen-containing gas flow field of the second power generation unit including the back surface forming the coolant flow field, are positioned in alignment with each other as viewed in a stacking direction.

5. The fuel cell stack according to claim 4, wherein a resin frame member is formed integrally with the membrane electrode assembly, around an outer end of the membrane electrode assembly; and the flow field inlet end or the flow field outlet end is provided to face the resin frame member.

\* \* \* \* \*